(12) United States Patent
Yang et al.

(10) Patent No.: US 12,276,864 B2
(45) Date of Patent: Apr. 15, 2025

(54) OPTICAL SYSTEM, LENS MODULE, AND TERMINAL DEVICE

(71) Applicant: JIANGXI JINGCHAO OPTICAL CO., LTD., Jiangxi (CN)

(72) Inventors: Jian Yang, Jiangxi (CN); Wenyan Zhang, Jiangxi (CN); Ming Li, Jiangxi (CN); Hairong Zou, Jiangxi (CN)

(73) Assignee: JIANGXI JINGCHAO OPTICAL CO., LTD., Nanchang (CN)

( * ) Notice: Subject to any disclaimer, the term of this patent is extended or adjusted under 35 U.S.C. 154(b) by 693 days.

(21) Appl. No.: 17/437,706

(22) PCT Filed: Apr. 3, 2020

(86) PCT No.: PCT/CN2020/083347
§ 371 (c)(1),
(2) Date: Sep. 9, 2021

(87) PCT Pub. No.: WO2021/196223
PCT Pub. Date: Oct. 7, 2021

(65) Prior Publication Data
US 2022/0299736 A1 Sep. 22, 2022

(51) Int. Cl.
*G02B 9/62* (2006.01)
*G02B 13/00* (2006.01)
(52) U.S. Cl.
CPC .......... *G02B 9/62* (2013.01); *G02B 13/0045* (2013.01)
(58) Field of Classification Search
CPC ................................................ G02B 13/0045
See application file for complete search history.

(56) References Cited

U.S. PATENT DOCUMENTS 9,798,113 B2 * 10/2017 Kubota .................. G02B 5/005
10,935,758 B2 * 3/2021 Lee ........................ G02B 9/62
(Continued)

FOREIGN PATENT DOCUMENTS

CN     103576296 A    2/2014
CN     103869452 A    6/2014
(Continued)

OTHER PUBLICATIONS

The International Search Report issued in corresponding International Application No. PCT/CN2020/083347, mailed Dec. 31, 2020, pp. 1-10, Beijing, China.
(Continued)

*Primary Examiner* — Christopher Stanford
(74) *Attorney, Agent, or Firm* — HAUPTMAN HAM, LLP

(57) ABSTRACT

An optical system, a lens module, and a terminal device are provided. The optical system includes a first lens, a second lens, a third lens, a fourth lens, a fifth lens, and a sixth lens. The first lens with a positive refractive power has an object-side surface which is convex at an optical axis. The second lens with a negative refractive power has an image-side surface which is concave at the optical axis. The third lens with a negative refractive power has an object-side surface which is convex at the optical axis and an image-side surface which is concave at the optical axis. The fourth lens with a negative refractive power has an image-side surface which is concave at the optical axis. The fifth lens and the sixth lens have the refractive power. The optical system satisfies expression $1<ftLtl4/ftGtl4<1.5$.

20 Claims, 9 Drawing Sheets

(56) References Cited

U.S. PATENT DOCUMENTS

| | | |
|---|---|---|
| 2018/0081153 A1 | 3/2018 | Huang |
| 2022/0099925 A1 * | 3/2022 | Wenren .................... G02B 9/62 |

FOREIGN PATENT DOCUMENTS

| | | | | |
|---|---|---|---|---|
| CN | 206960765 U | | 2/2018 | |
| CN | 107817575 A | | 3/2018 | |
| CN | 108152934 A | * | 6/2018 | ......... G02B 13/0045 |
| CN | 108279481 A | | 7/2018 | |
| CN | 108732724 A | * | 11/2018 | ......... G02B 13/0045 |
| CN | 108873252 A | * | 11/2018 | ......... G02B 13/0045 |
| CN | 109613683 A | | 4/2019 | |
| CN | 209570744 U | | 11/2019 | |
| CN | 210129060 U | | 3/2020 | |
| CN | 211786328 U | | 10/2020 | |
| JP | 6160423 B2 | * | 7/2017 | |
| WO | 2017022670 A1 | | 2/2017 | |
| WO | WO-2019105139 A1 | * | 6/2019 | ......... G02B 13/0045 |
| WO | WO-2019134602 A1 | * | 7/2019 | ......... G02B 13/0045 |

OTHER PUBLICATIONS

First Office Action issued in corresponding CN application No. 202010260761.6 dated Nov. 22, 2024.

* cited by examiner

LONGITUDINAL SPHERICAL ABER.

ASTIGMATIC FIELD CURVES

DISTORTION

FOCUS (MILLIMETER)

FOCUS (MILLIMETER)

DISTORTION (%)

OPTICAL SYSTEM, LENS MODULE, AND TERMINAL DEVICE

RELATED APPLICATION

The present application is a National Phase of International Application No. PCT/CN2020/083347, filed Apr. 3, 2020.

TECHNICAL FIELD

This disclosure relates to the field of optical imaging technology, and more particularly to an optical system, a lens module, and a terminal device.

BACKGROUND

With the wide application of novel electronic products in daily life, such as mobile phones, tablet personal computers (PCs), unmanned aerial vehicles, and computers, various technological advancements emerge one after another. Among them, the improvement in a shooting effect of a camera lens in novel electronic products becomes the focus of attention.

With an increasing demand for long-distance shooting, the camera lens needs to have a long focal length. However, field curvature is easy to occur and high imaging quality is hard to be guaranteed, which leads to a poor effect of long-distance shooting.

Therefore, how to realize long-distance and high-resolution shooting while avoiding field curvature so as to make the scene at a far objective-distance be imaged clearly on an imaging surface is supposed to be the research and study direction in the field.

SUMMARY

Disclosed herein are implementations of an optical system, a lens module, and a terminal device. The optical system solves the technical problem of poor imaging effect in long-distance shooting and can realize high-resolution long-distance shooting.

In a first aspect, an optical system is provided. The optical system includes multiple lenses, i.e., a first lens with a positive refractive power, a second lens with a negative refractive power, a third lens with a negative refractive power, a fourth lens with a negative refractive power, a fifth lens with a refractive power, and a sixth lens with a refractive power, which are arranged in order from an object side to an image side. The first lens has an object-side surface which is convex at an optical axis. The second lens has an image-side surface which is concave at the optical axis. The third lens has an object-side surface which is convex at the optical axis and an image-side surface which is concave at the optical axis. The fourth lens has an image-side surface which is concave at the optical axis. The optical system satisfies the expression $1<ftLtl4/ftGtl4<1.5$, where ftLtl4 represents a longest distance from the object-side surface of the fourth lens to the image-side surface of the fourth lens in a direction parallel to the optical axis, and ftGtl4 represents a shortest distance from the object-side surface of the fourth lens to the image-side surface of the fourth lens in the direction parallel to the optical axis.

In this disclosure, through proper arrangement of the refractive power of each of the first lens to the sixth lens and the surface profile of each of the first, second, third, and fourth lens in the optical system, the optical system has a characteristic of a long focal length and high imaging quality, which can realize high-resolution long-distance shooting. Meanwhile, when the optical system satisfies the expression $1<ftLtl4/ftGtl4<1.5$, an optical path difference of the optical system can be effectively balanced and a field curvature can be corrected. In this way, distortion around the image can be avoided and an imaging effect can be closer to a photographed object itself. In addition, the photographed image has high imaging quality, high definition, and high resolution.

In some implementations, the optical system satisfies the expression $0.5<DL1/Imgh<1$, where DL1 represents an effective aperture of the first lens, and Imgh represents half of a diagonal length of an effective pixel area of the optical system on an imaging surface. A size of the aperture of the first lens determines an amount of passed light of the whole optical system. The size of a photosensitive surface determines picture clarity and a pixel size of the whole optical system. Only when a reasonable balance is stricken between the size of the aperture of the first lens and the size of the photosensitive surface can ensure sufficient amount of passed light and picture clarity. If $DL1/Imgh>1$, over exposure and high light brightness will occur, which will affect imaging quality. If $DL1/Imgh<0.5$, insufficient amount of passed light and relatively low light brightness will occur, which will reduce the picture definition.

In some implementations, the optical system satisfies the expression $2<f/f1<3$, where f represents an effective focal length of the optical system, and f1 represents a focal length of the first lens. The first lens provides all optical information of the optical system from an object space to an image space. The focal length of the first lens determines acquisition of the optical information of the object space by the optical system. If $f/f1 \geq 3$, a sensitivity of the optical system will increase and a processing technology will be difficult. In addition, it will be more difficult to correct an aberration produced by the first lens, which is hard to meet shooting requirements. If $f/f1 \leq 2$, a ratio of the focal length between the first lens and the optical system is improper, and the aberration produced by the first lens cannot be corrected.

In some implementations, the optical system satisfies the expression $-0.5<f1/f2<-0.2$, where f1 represents the focal length of the first lens, and f2 represents a focal length of the second lens. The first lens has the positive refractive power, which can converge light, thereby facilitating the convergence of light in the object space. The second lens has the negative refractive power, which can correct a positional chromatic aberration produced by the first lens. The combination of the first lens with the positive refractive power and the second lens with the negative refractive power can effectively correct the positional chromatic aberration and improve imaging clarity.

In some implementations, the optical system satisfies the expression $0.05<airL3/TTL<0.3$, where airL3 represents a distance on the optical axis from the image-side surface of the third lens to the object-side surface of the fourth lens, and TTL represents a distance on the optical axis from the object-side surface of the first lens to an imaging surface of the optical system. Through defining a suitable range of airL3/TTL, an assembly sensitivity of the optical system can be reduced and an assembly yield can be improved. If $airL3/TTL>0.3$, a length of the optical system will be too long. If $airL3/TTL<0.05$, the assembly yield will be reduced due to the increased assembly sensitivity.

In some implementations, the optical system satisfies the expression $1\ mm<(R5*R6)/(R5+R6)<4.5\ mm$, where R5 represents a radius of curvature of the object-side surface of the third lens on the optical axis, and R6 represents a radius of curvature of the image-side surface of the third lens on the optical axis. Through defining a suitable range of (R5*R6)/(R5+R6), the optical path difference of the optical system between an edge ray and a paraxial ray can be reasonably balanced and the field curvature and an astigmatism can be reasonably corrected; meanwhile, the sensitivity of the optical system can be reduced and an assembly stability can be increased.

In some implementations, the optical system satisfies the expression FBL/TTL>0.1, where FBL represents a distance on the optical axis from an intersection between the image-side surface of the sixth lens and the optical axis to the imaging surface, and TTL represents a distance on the optical axis from the object-side surface of the first lens to the imaging surface of the optical system. Through defining a suitable range of FBL/TTL, the demand for a compact size and a sufficient focus range of the optical system can be satisfied so that the assembly yield of the optical system can be improved; meanwhile, a relatively large focal depth of the optical system can be ensured so that more depth information of the object space can be obtained.

In some implementations, the optical system further includes a stop located at the object side of the first lens or between two adjacent lenses among the multiple lenses. The optical system satisfies the expression 0.5<DL/Imgh<1, where DL represents an aperture of the stop, and Imgh represents half of the diagonal length of the effective pixel area of the optical system on the imaging surface. The size of the aperture of the stop determines an amount of passed light of the whole optical system. The size of the photosensitive surface determines picture clarity and a pixel size of the whole optical system. Only when the reasonable balance is stricken between the size of the aperture of the stop and the size of the photosensitive surface can ensure sufficient amount of passed light and picture clarity. If DL1/Imgh>1, over exposure and high light brightness will occur, which will affect imaging quality. If DL1/Imgh<0.5, insufficient amount of passed light and relatively low light brightness will occur, which will reduce the picture definition.

In some implementations, the optical system further includes the stop located at the object side of the first lens or between two adjacent lenses among the multiple lenses. The optical system satisfies the expression 1.5<TTL/DL<2.2, where TTL represents the distance on the optical axis from the object-side surface of the first lens to the imaging surface of the optical system, and DL represents the aperture of the stop. Through defining a suitable range of TTL/DL, the design demand for the compact size of the optical system and the amount of passed light required for shooting by the optical system can be satisfied, so as to realize the shooting effect with high imaging quality and high definition. If TTL/DL<1.5, the design demand for the compact size of the optical system can be satisfied, however, a clear aperture will be too large such that the edge ray will enter into the optical system to reduce the imaging quality. If TTL/DL<2.2, the design demand for the compact size of the optical system can be satisfied, however, the clear aperture of the stop will be too small to satisfy the amount of passed light required by the optical system.

In some implementations, the optical system satisfies the expression 0.7<TTL/f<1, where TTL represents the distance on the optical axis from the object-side surface of the first lens to the imaging surface of the optical system, and f represents the effective focal length of the optical system. Through defining the suitable range of TTL/f, not only the compact size of the optical system can be realized, but also the better convergence of light on the imaging surface can be ensured. If TTL/f≤0.7, the length of the optical system will be too short and the sensitivity of the system will increase, thereby negatively affecting the convergence of light on the imaging surface. If TTL/f≥1, the length of the optical system will be too long and an incidence angle of a chief ray entering the imaging surface is too large. Therefore, the edge ray cannot be incident on the imaging surface, which will lead to incomplete imaging information.

In a second aspect, a lens module is further provided. The lens module includes the optical system as described in any one of implementations, and a photosensitive element located at the image side of the optical system.

In a third aspect, a terminal device is further provided. The terminal device includes the lens module.

Through the proper arrangement of the refractive power of each of the first lens to the sixth lens and the surface profile of each of the first, second, third, and fourth lens in the optical system, the optical system has the characteristic of the long focal length and high imaging quality, which can realize high-resolution long-distance shooting. Meanwhile, when the optical system satisfies the expression 1<ftLtl4/ftGtl4<1.5, the optical path difference of the optical system can be effectively balanced and the field curvature can be corrected. In this way, the distortion around the image can be avoided and the imaging effect can be closer to the photographed object itself. In addition, the photographed image has high imaging quality, high definition, and high resolution.

BRIEF DESCRIPTION OF THE DRAWINGS

To describe technical solutions in implementations of the present disclosure or in the background more clearly, the following briefly introduces the accompanying drawings required for describing the implementations or the background.

DETAILED DESCRIPTION

Implementations of this disclosure will be described hereinafter with reference to the accompanying drawings of this disclosure.

Figure 1:
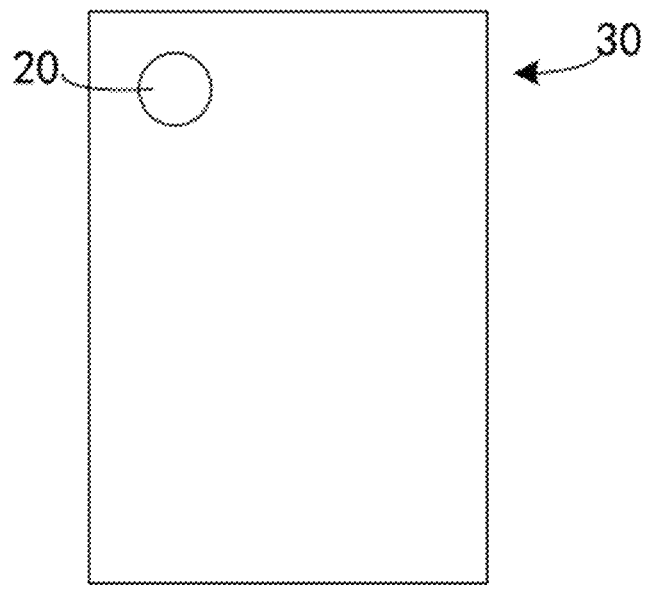
FIG. 1 is a schematic diagram of an optical system used in a terminal device according to this disclosure.

Referring to FIG. 1, an optical system in this disclosure is applicable in a lens module 20 of a terminal device 30. The terminal device 30 can be a mobile phone, a tablet computer, an unmanned aerial vehicle, a computer, and other types of devices. A photosensitive element of the lens module 20 is located at an image side of the optical system, and the lens module 20 is assembled in the terminal device 30.

In this disclosure, a lens module is provided. The lens module includes the photosensitive element and the optical system. The photosensitive element is located at the image side of the optical system. The photosensitive element is configured to convert a ray, which passes through the first to sixth lenses and is incident on the photosensitive element, to an electrical signal of an image. The photosensitive element may be a complementary metal oxide semiconductor (CMOS) or a charge-coupled device (CCD). Through installing the optical system in the lens module, the lens module can have characteristics of a long focal length and high imaging quality to realize high-resolution long-distance shooting.

In this disclosure, a terminal device is further provided. The terminal device includes the lens module provided in the implementations of this disclosure. The terminal device may be a mobile phone, a tablet computer, an unmanned aerial vehicle, a computer, and the like. Through installing the lens module in the terminal device, the terminal device can have characteristics of a long focal length and high imaging quality to realize high-resolution long-distance shooting.

In this disclosure, an optical system is provided. The optical system includes six lenses, i.e., a first lens, a second lens, a third lens, a fourth lens, a fifth lens, and a sixth lens, arranged in order from an object side to an image side of the optical system.

Specifically, surfaces and the refractive power of each of the six lenses can be set as follows. The first lens with a positive refractive power has an object-side surface which is convex at an optical axis. The second lens with a negative refractive power has an image-side surface which is concave at the optical axis. The third lens with a negative refractive power has the object-side surface which is convex at the optical axis and the image-side surface which is concave at the optical axis. The fourth lens with a negative refractive power has the image-side surface which is concave at the optical axis. The fifth lens with a refractive power. The sixth lens with a refractive power.

The optical system satisfies the expression $1<ftLtl4/ftGtl4<1.5$, where ftLtl4 represents a longest distance from the object-side surface of the fourth lens to the image-side surface of the fourth lens in a direction parallel to the optical axis, and ftGtl4 represents a shortest distance from the object-side surface of the fourth lens to the image-side surface of the fourth lens in the direction parallel to the optical axis.

Through proper arrangement of the refractive power of each of the first lens to the sixth lens and the surface profile of each of the first, second, third, and fourth lens in the optical system, the optical system has a characteristic of a long focal length and high imaging quality, which can realize high-resolution long-distance shooting. Meanwhile, when the optical system satisfies the expression $1<ftLtl4/ftGtl4<1.5$, an optical path difference of the optical system can be effectively balanced and a field curvature can be corrected. In this way, distortion around the image can be avoided and an imaging effect can be closer to a photographed object itself. In addition, the photographed image has high imaging quality, high definition, and high resolution.

In some implementations, the optical system satisfies the expression $0.5<DL1/Imgh<1$, where DL1 represents an effective aperture of the first lens, and Imgh represents half of a diagonal length of an effective pixel area of the optical system on an imaging surface. A size of the aperture of the first lens determines an amount of passed light of the whole optical system. The size of a photosensitive surface determines picture clarity and a pixel size of the whole optical system. Only when a reasonable balance is stricken between the size of the aperture of the first lens and the size of the photosensitive surface can ensure sufficient amount of passed light and picture clarity. If $DL1/Imgh>1$, over exposure and high light brightness will occur, which will affect imaging quality. If $DL1/Imgh<0.5$, insufficient amount of passed light and relatively low light brightness will occur, which will reduce the picture definition.

In some implementations, the optical system satisfies the expression $2<f/f1<3$, where f represents an effective focal length of the optical system, and f1 represents a focal length of the first lens. The first lens provides all optical information of the optical system from an object space to an image space. The focal length of the first lens determines acquisition of the optical information of the object space by the optical system. If $f/f1 \geq 3$, a sensitivity of the optical system will increase and a processing technology will be difficult. In addition, it will be more difficult to correct an aberration produced by the first lens, which is hard to meet shooting requirements. If $f/f1 \leq 2$, a ratio of the focal length between the first lens and the optical system is improper, and the aberration produced by the first lens cannot be corrected.

In some implementations, the optical system satisfies the expression −0.5<f1/f2<−0.2, where f1 represents the focal length of the first lens, and f2 represents a focal length of the second lens. The first lens has the positive refractive power, which can converge light, thereby facilitating the convergence of light in the object space. The second lens has the negative refractive power, which can correct a positional chromatic aberration produced by the first lens. The combination of the first lens with the positive refractive power and the second lens with the negative refractive power can effectively correct the positional chromatic aberration and improve imaging clarity.

In some implementations, the optical system satisfies the expression 0.05<airL3/TTL<0.3, where airL3 represents a distance on the optical axis from the image-side surface of the third lens to the object-side surface of the fourth lens, and TTL represents a distance on the optical axis from the object-side surface of the first lens to an imaging surface of the optical system. Through defining a suitable range of airL3/TTL, an assembly sensitivity of the optical system can be reduced and an assembly yield can be improved. If airL3/TTL>0.3, a length of the optical system will be too long. If airL3/TTL<0.05, the assembly yield will be reduced due to the increased assembly sensitivity.

In some implementations, the optical system satisfies the expression 1 mm<(R5*R6)/(R5+R6)<4.5 mm, where R5 represents a radius of curvature of the object-side surface of the third lens on the optical axis, and R6 represents a radius of curvature of the image-side surface of the third lens on the optical axis. Through defining a suitable range of (R5*R6)/(R5+R6), the optical path difference of the optical system between an edge ray and a paraxial ray can be reasonably balanced and the field curvature and an astigmatism can be reasonably corrected; meanwhile, the sensitivity of the optical system can be reduced and an assembly stability can be increased.

In some implementations, the optical system satisfies the expression FBL/TTL>0.1, where FBL represents a distance on the optical axis from an intersection between the image-side surface of the sixth lens and the optical axis to the imaging surface, and TTL represents a distance on the optical axis from the object-side surface of the first lens to the imaging surface of the optical system. Through defining a suitable range of FBL/TTL, the demand for a compact size and a sufficient focus range of the optical system can be satisfied so that the assembly yield of the optical system can be improved; meanwhile, a relatively large focal depth of the optical system can be ensured so that more depth information of the object space can be obtained.

In some implementations, the optical system further includes a stop located at the object side of the first lens or between two adjacent lenses among the multiple lenses. The optical system satisfies the expression 0.5<DL/Imgh<1, where DL represents an aperture of the stop, and Imgh represents half of the diagonal length of the effective pixel area of the optical system on the imaging surface. The size of the aperture of the stop determines an amount of passed light of the whole optical system. The size of the photosensitive surface determines picture clarity and a pixel size of the whole optical system. Only when the reasonable balance is stricken between the size of the aperture of the stop and the size of the photosensitive surface can ensure sufficient amount of passed light and picture clarity. If DL/Imgh>1, over exposure and high light brightness will occur, which will affect imaging quality. If DL/Imgh<0.5, insufficient amount of passed light and relatively low light brightness will occur, which will reduce the picture definition.

In some implementations, the optical system further includes the stop located at the object side of the first lens or between two adjacent lenses among the multiple lenses. The optical system satisfies the expression 1.5<TTL/DL<2.2, where TTL represents the distance on the optical axis from the object-side surface of the first lens to the imaging surface of the optical system, and DL represents the aperture of the stop. Through defining a suitable range of TTL/DL, the design demand for the compact size of the optical system and the amount of passed light required for shooting by the optical system can be satisfied, so as to realize the shooting effect with high imaging quality and high definition. If TTL/DL<1.5, the design demand for the compact size of the optical system can be satisfied, however, a clear aperture will be too large and the edge ray will enter into the optical system, which will reduce the imaging quality. If TTL/DL>2.2, the design demand for the compact size of the optical system can be satisfied, however, the clear aperture of the stop will be too small to satisfy the amount of passed light required by the optical system.

In some implementations, the optical system satisfies the expression 0.7<TTL/f<1, where TTL represents the distance on the optical axis from the object-side surface of the first lens to the imaging surface of the optical system, and f represents the effective focal length of the optical system. Through defining the suitable range of TTL/f, not only the compact size of the optical system can be realized, but also the better convergence of light on the imaging surface can be ensured. If TTL/f≤0.7, the length of the optical system will be too short and the sensitivity of the system will increase, thereby negatively affecting the convergence of light on the imaging surface. If TTL/f≥1, the length of the optical system will be too long and an incidence angle of a chief ray entering the imaging surface will be too large. Therefore, the edge ray cannot be incident on the imaging surface, which will lead to incomplete imaging information.

Through defining each of the parameters described above, the optical system is enabled with high imaging quality. For example, a value of ftLtl4/ftGtl4 may be 1.04, 1.26, or 1.24. The value of DL1/Imgh may be 0.81, 0.70, or 0.69. The value of f/f1 may be 2.31, 2.47, or 2.39. The value of f1/f2 may be −0.45, −0.41, or −0.39. The value of airL3/TTL may be 0.18, 0.17, or 0.16.

The optical system is provided with aspheric lenses to facilitate correction of an aberration of the optical system and improve imaging quality of the optical system. Equations which apply to aspherical curves include but are not limited to the following expression:

$$Z = \frac{cr^2}{1+\sqrt{1-(k+1)c^2r^2}} + \sum_i Air^i$$

Where Z represents a distance from a respective point on an aspheric surface to a plane tangent to a vertex of the aspheric surface, r represents a distance from the respective point on the aspheric surface to the optical axis, c represents a curvature of the vertex of the aspheric surface, k represents a conic coefficient, and Ai represents a coefficient corresponding to the i-th higher-order term in the aspherical equation.

Detailed description will be provided hereinafter, through eight implementations, to illustrate this disclosure.

First Implementation

Figure 2:
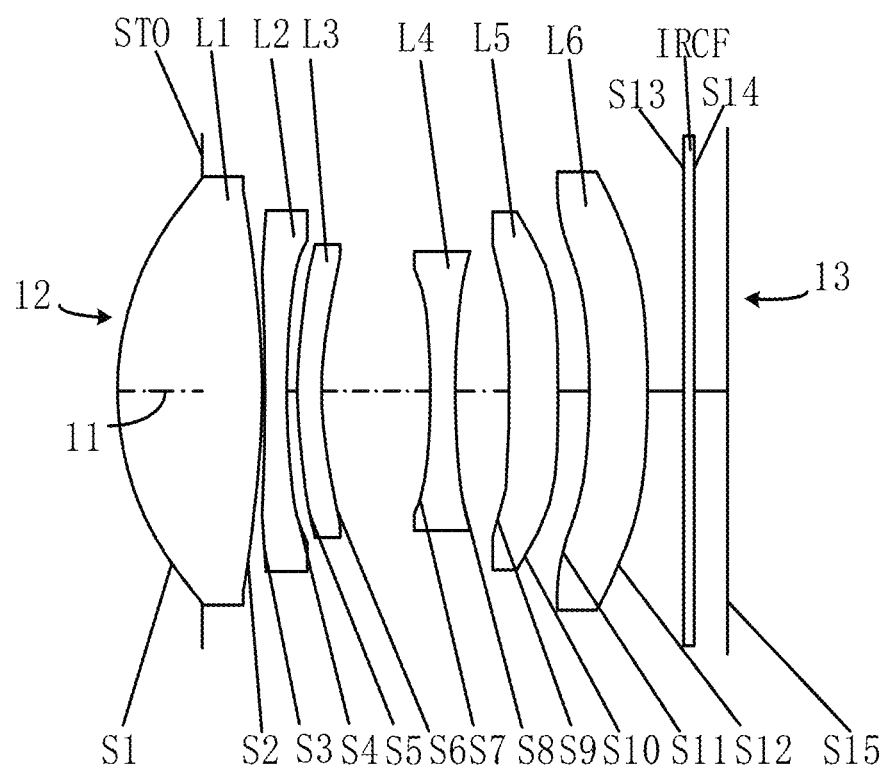
FIG. 2 is a schematic structural diagram of an optical system according to a first implementation of this disclosure.

In FIG. 2, a straight line 11 represents an optical axis. A side of a first lens L1 away from a second lens L2 is an object side 12 of the first lens L1. A side of a sixth lens L6 away from a fifth lens L5 is an image side 13 of the sixth lens L6. An optical system of this implementation includes, from the object side 12 to the image side 13, a stop STO, the first lens L1, the second lens L2, a third lens L3, a fourth lens L4, the fifth lens L5, the sixth lens L6, and an infrared cut filter (IRCF), The first lens L1 with a positive refractive power is made of plastic. An object-side surface S1 is convex at the optical axis and at a circumference. An image-side surface S2 is convex at the optical axis and at the circumference. Both the object-side surface S1 and the image-side surface S2 of the first lens L1 are aspheric.

The second lens L2 with a negative refractive power is made of plastic. An object-side surface S3 is concave at the optical axis and convex at the circumference. An image-side surface S4 is concave at the optical axis and at the circumference. Both the object-side surface S3 and the image-side surface S4 of the second lens L2 are aspheric.

The third lens L3 with the negative refractive power is made of plastic. An object-side surface S5 is convex at the optical axis and at the circumference. An image-side surface S6 is concave at the optical axis and at the circumference. Both the object-side surface S5 and the image-side surface S6 of the third lens L3 are aspheric.

Both the object-side surface S9 and the image-side surface S10 of the fifth lens L5 are aspheric.

The sixth lens L6 with the negative refractive power is made of plastic. An object-side surface S11 is concave at the optical axis and at the circumference. An image-side surface S12 is convex at the optical axis and at the circumference. Both the object-side surface S11 and the image-side surface S12 of the sixth lens L6 are aspheric.

The stop STO can be located between the object side of the optical system and the sixth lens L6. In this implementation, the stop STO is disposed at one side of the first lens L1 away from the second lens L2 to control the amount of light received.

The IRCF, including an object-side surface S13 and an image-side surface S14, is made of glass and disposed after the sixth lens L6. The IRCF is configured to filter out infrared rays to make the rays incident onto an imaging surface visible. Visible light has a wavelength ranging from 380 nm to 780 nm.

An imaging surface S15 is the surface where an image formed by the light of the photographed object after going through the optical system is located.

Table 1a illustrates characteristics of the optical system in this disclosure, where a radius of curvature in this implementation is the radius of curvature of each of the lenses at the optical axis.

TABLE 1a

First implementation
f = 7.1 mm, FNO = 1.99, FOV = 31.46°, TTL = 6.4 mm

| Surface number | Surface name | Surface type | Radius of curvature (mm) | Thickness (mm) | Material | Refractive index | Abbe number | Focal length (mm) |
|---|---|---|---|---|---|---|---|---|
| Object surface | Object surface | spheric | Infinity | Infinity | | | | |
| STO | stop | aspheric | Infinity | −0.887 | | | | |
| S1 | First | aspheric | 2.036 | 1.515 | plastic | 1.54 | 56.14 | 3.07 |
| S2 | lens | aspheric | −6.994 | 0.030 | | | | |
| S3 | Second | aspheric | −37.965 | 0.230 | plastic | 1.66 | 20.35 | −6.81 |
| S4 | lens | aspheric | 5.175 | 0.111 | | | | |
| S5 | Third | aspheric | 2.595 | 0.253 | plastic | 1.64 | 23.54 | −19.17 |
| S6 | lens | aspheric | 2.063 | 1.141 | | | | |
| S7 | Fourth | aspheric | −7.941 | 0.264 | plastic | 1.54 | 56.14 | −5.94 |
| S8 | lens | aspheric | 5.542 | 0.563 | | | | |
| S9 | Fifth | aspheric | −120.696 | 0.515 | plastic | 1.64 | 23.54 | 16.81 |
| S10 | lens | aspheric | −9.959 | 0.329 | | | | |
| S11 | Sixth | aspheric | −4.043 | 0.608 | plastic | 1.54 | 56.14 | −17.53 |
| S12 | lens | aspheric | −7.371 | 0.380 | | | | |
| S13 | Infrared | spheric | Infinity | 0.110 | glass | | | |
| S14 | cut filter | spheric | Infinity | 0.350 | | | | |
| S15 | Imaging surface | spheric | Infinity | 0.000 | | | | |

Note:
a reference wavelength is 555 nm

The fourth lens L4 with the negative refractive power is made of plastic. An object-side surface S7 is concave at the optical axis and at the circumference. An image-side surface S8 is concave at the optical axis and at the circumference. Both the object-side surface S7 and the image-side surface S8 of the fourth lens L4 are aspheric.

The fifth lens L5 with the positive refractive power is made of plastic. An object-side surface S9 is concave at the optical axis and at the circumference. An image-side surface S10 is convex at the optical axis and at the circumference.

In Table 1a, f represents an effective focal length of the optical system, FNO represents a f-number of the optical system, FOV represents an angle of view of the optical system diagonally, and TTL represents a distance on the optical axis from the object-side surface of the first lens to the imaging surface of the optical system.

Table 1b shows high-order coefficients A4, A6, A8, A10, A12, A14, A16, A18, and A20 which are applicable to each of the aspheric lens surfaces S1, S2, S3, S4, S5, S6, S7, S8, S9, S10, S11, and S12 of the first implementation.

TABLE 1b

| Surface number | K | A4 | A6 | A8 | A10 |
|---|---|---|---|---|---|
| S1 | −1.859E+00 | 2.464E−02 | −1.010E−03 | 3.630E−03 | −6.080E−03 |
| S2 | −8.027E+00 | −8.826E−02 | 2.148E−01 | −2.801E−01 | 2.269E−01 |
| S3 | 5.517E+00 | −6.757E−02 | 9.076E−02 | 6.592E−02 | −3.721E−01 |
| S4 | 5.517E+00 | −3.730E−02 | −9.889E−02 | 6.615E−01 | −1.447E+00 |
| S5 | −1.448E+01 | −8.554E−02 | −6.161E−02 | 8.075E−01 | −1.909E+00 |
| S6 | −1.313E+01 | 2.340E−03 | −1.501E−01 | 6.954E−01 | −1.505E+00 |
| S7 | 1.170E+01 | −1.075E−01 | 1.750E−03 | 4.003E−01 | −1.158E+00 |
| S8 | 8.007E−01 | −5.740E−02 | 3.228E−02 | 2.728E−01 | −6.009E−01 |
| S9 | −1.364E+01 | −2.531E−02 | −9.415E−02 | 5.940E−03 | 1.266E−01 |
| S10 | 7.391E+00 | 3.836E−02 | −1.226E−01 | −1.150E−01 | 3.164E−01 |
| S11 | 1.307E+00 | 6.371E−02 | −1.077E−02 | −2.905E−01 | 4.022E−01 |
| S12 | 5.645E+00 | −3.018E−02 | 3.297E−02 | −1.023E−01 | 9.862E−02 |

| Surface number | A12 | A14 | A16 | A18 | A20 |
|---|---|---|---|---|---|
| S1 | 6.180E−03 | −3.710E−03 | 1.300E−03 | −2.500E−04 | 2.000E−05 |
| S2 | −1.149E−01 | 3.507E−02 | −5.810E−03 | 3.700E−04 | 1.000E−05 |
| S3 | 5.231E−01 | −3.782E−01 | 1.538E−01 | −3.357E−02 | 3.070E−03 |
| S4 | 1.637E+00 | −1.002E+00 | 3.132E−01 | −3.592E−02 | −1.630E−03 |
| S5 | 2.301E+00 | −1.521E+00 | 5.218E−01 | −6.944E−02 | −2.010E−03 |
| S6 | 1.873E+00 | −1.346E+00 | 5.121E−01 | −7.901E−02 | −7.700E−04 |
| S7 | 1.775E+00 | −1.783E+00 | 1.193E+00 | −5.198E−01 | 1.115E−01 |
| S8 | 6.365E−01 | −3.433E−01 | 5.065E−02 | 2.677E−02 | −8.140E−03 |
| S9 | −1.027E−01 | −7.985E−02 | 1.660E−01 | −8.972E−02 | 1.639E−02 |
| S10 | −2.696E−01 | 1.021E−01 | −5.960E−02 | −6.680E−03 | 1.360E−03 |
| S11 | −2.457E−01 | 8.350E−02 | −1.647E−02 | 1.770E−03 | −8.000E−05 |
| S12 | −4.548E−02 | 1.113E−02 | −1.340E−03 | 4.000E−05 | 0.000E+00 |

Figure 3:
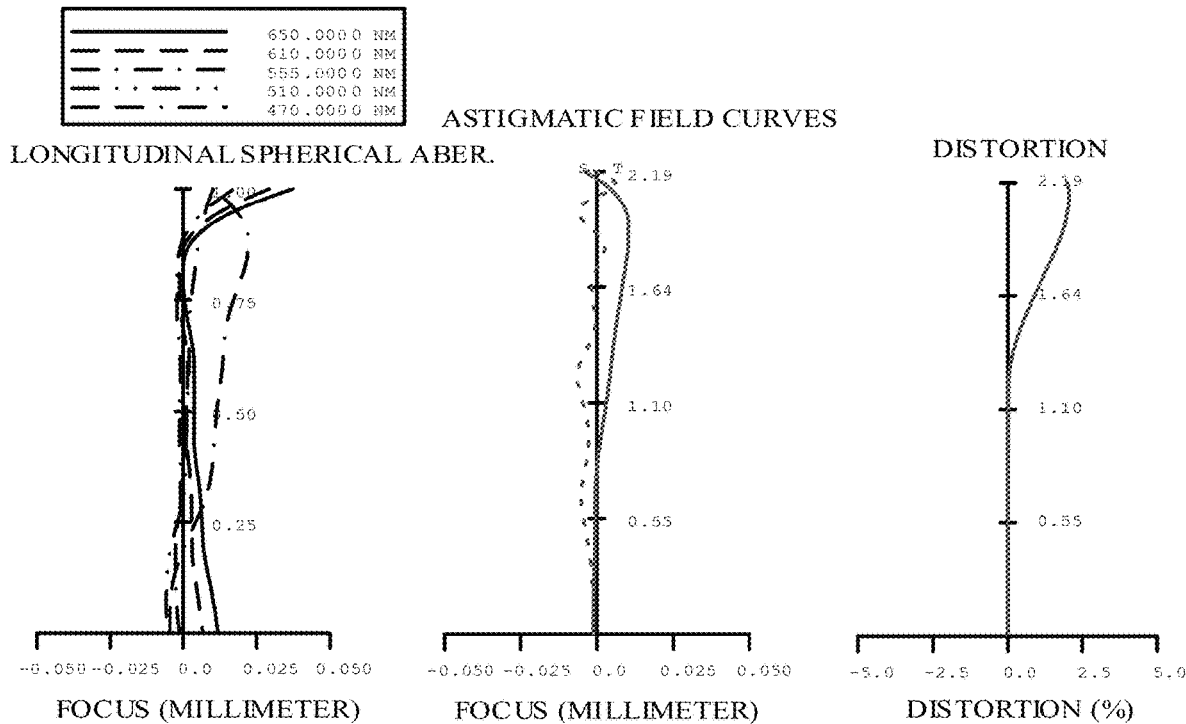
FIG. 3 illustrates a longitudinal spherical aberration curve, an astigmatic curve, and a distortion curve of the optical system according to the first implementation of this disclosure.

FIG. 3 shows a longitudinal spherical aberration curve, an astigmatic curve, and a distortion curve of the optical system according to the first implementation. The longitudinal spherical aberration curve represents that a converging point of rays with different wavelengths deviates after the rays go through the lenses of the optical system. The astigmatic curve represents meridional image plane bending and sagittal image plane bending. The distortion curve represents distortion values corresponding to different angles of view. As can be seen in FIG. 3, the optical system in the first implementation has high imaging quality.

Second Implementation

Figure 4:
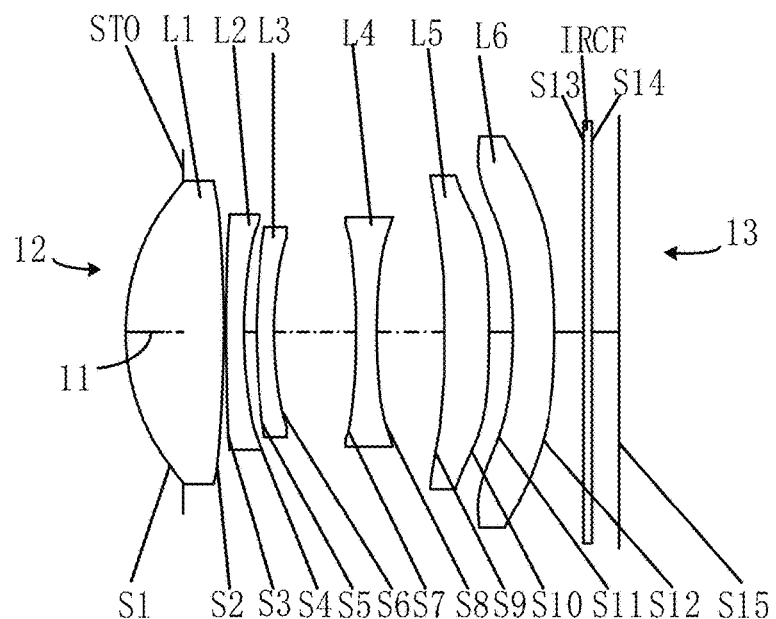
FIG. 4 is a schematic structural diagram of an optical system according to a second implementation of this disclosure.

In FIG. 4, the straight line 11 represents the optical axis. The side of the first lens L1 away from the second lens L2 is the object side 12 of the first lens L1. The side of the sixth lens L6 away from the fifth lens L5 is the image side 13 of the sixth lens L6. The optical system of this implementation includes, from the object side 12 to the image side 13, the stop STO, the first lens L1, the second lens L2, the third lens L3, the fourth lens L4, the fifth lens L5, the sixth lens L6, and the IRCF.

The first lens L1 with the positive refractive power is made of plastic. The object-side surface S1 is convex at the optical axis and at a circumference. The image-side surface S2 is convex at the optical axis and at the circumference. Both the object-side surface S1 and the image-side surface S2 of the first lens L1 are aspheric.

The second lens L2 with the negative refractive power is made of plastic. The object-side surface S3 is convex at the optical axis and at the circumference. The image-side surface S4 is concave at the optical axis and at the circumference. Both the object-side surface S3 and the image-side surface S4 of the second lens L2 are aspheric.

The third lens L3 with the negative refractive power is made of plastic. The object-side surface S5 is convex at the optical axis and at the circumference. The image-side surface S6 is concave at the optical axis and at the circumference. Both the object-side surface S5 and the image-side surface S6 of the third lens L3 are aspheric.

The fourth lens L4 with the negative refractive power is made of plastic. The object-side surface S7 is concave at the optical axis and at the circumference. The image-side surface S8 is concave at the optical axis and at the circumference. Both the object-side surface S7 and the image-side surface S8 of the fourth lens L4 are aspheric.

The fifth lens L5 with the positive refractive power is made of plastic. The object-side surface S9 is concave at the optical axis and at the circumference. The image-side surface S10 is convex at the optical axis and at the circumference. Both the object-side surface S9 and the image-side surface S10 of the fifth lens L5 are aspheric.

The sixth lens L6 with the negative refractive power is made of plastic. The object-side surface S11 is concave at the optical axis and at the circumference. The image-side surface S12 is convex at the optical axis and at the circumference. Both the object-side surface S11 and the image-side surface S12 of the sixth lens L6 are aspheric.

The stop STO can be located between the object side of the optical system and the sixth lens L6. In this implementation, the stop STO is disposed at one side of the first lens L1 away from the second lens L2 to control the amount of light entered or received.

The IRCF is disposed after the sixth lens L6. The IRCF has the object-side surface S13 and the image-side surface S14. The IRCF is configured to filter out infrared rays to make the rays incident onto the imaging surface visible. Visible light has the wavelength ranging from 380 nm to 780 nm. The IRCF is made of glass.

The imaging surface S15 is the surface where the image formed by the light of the photographed object after going through the optical system is located.

Table 2a illustrates the characteristics of the optical system in this disclosure, where the radius of curvature in this implementation is the radius of curvature of each of the lenses at the optical axis.

TABLE 2a

Second implementation
F = 7.5 mm, FNO = 2.44, FOV = 30.00°, TTL = 6.4 mm

| Surface number | Surface name | Surface type | Radius of curvature (mm) | Thickness (mm) | Material | Refractive index | Abbe number | Focal Length (mm) |
|---|---|---|---|---|---|---|---|---|
| Object surface | Object surface | spheric | Infinity | Infinity | | | | |
| STO | Stop | aspheric | Infinity | −0.741 | | | | |
| S1 | First lens | aspheric | 1.828 | 1.270 | plastic | 1.54 | 56.14 | 3.03 |
| S2 | | aspheric | −13.341 | 0.030 | | | | |
| S3 | Second lens | aspheric | 14.498 | 0.230 | plastic | 1.66 | 20.35 | −7.60 |
| S4 | | aspheric | 3.733 | 0.166 | | | | |
| S5 | Third lens | aspheric | 4.043 | 0.230 | plastic | 1.64 | 23.54 | −14.47 |
| S6 | | aspheric | 2.757 | 1.064 | | | | |
| S7 | Fourth lens | aspheric | −7.822 | 0.267 | plastic | 1.54 | 56.14 | −5.26 |
| S8 | | aspheric | 4.597 | 0.875 | | | | |
| S9 | Fifth lens | aspheric | −60.605 | 0.579 | plastic | 1.64 | 23.54 | 13.10 |
| S10 | | aspheric | −7.437 | 0.307 | | | | |
| S11 | Sixth lens | aspheric | −3.503 | 0.543 | plastic | 1.54 | 56.14 | −18.08 |
| S12 | | aspheric | −5.729 | 0.380 | | | | |
| S13 | Infrared cut filter | spheric | Infinity | 0.110 | glass | | | |
| S14 | | spheric | Infinity | 0.350 | | | | |
| S15 | Imaging surface | spheric | Infinity | 0.000 | | | | |

Note:
a reference wavelength is 555 nm

In Table 2a, f represents the effective focal length of the optical system, FNO represents the f-number of the optical system, FOV represents the angle of view of the optical system diagonally, and TTL represents the distance on the optical axis from the object-side surface of the first lens to the imaging surface of the optical system.

Table 2b shows the high-order coefficients A4, A6, A8, A10, A12, A14, A16, A18, and A20 which are applicable to each of the aspheric lens surfaces S1, S2, S3, S4, S5, S6, S7, S8, S9, S10, S11, and S12 of the second implementation.

Figure 5:
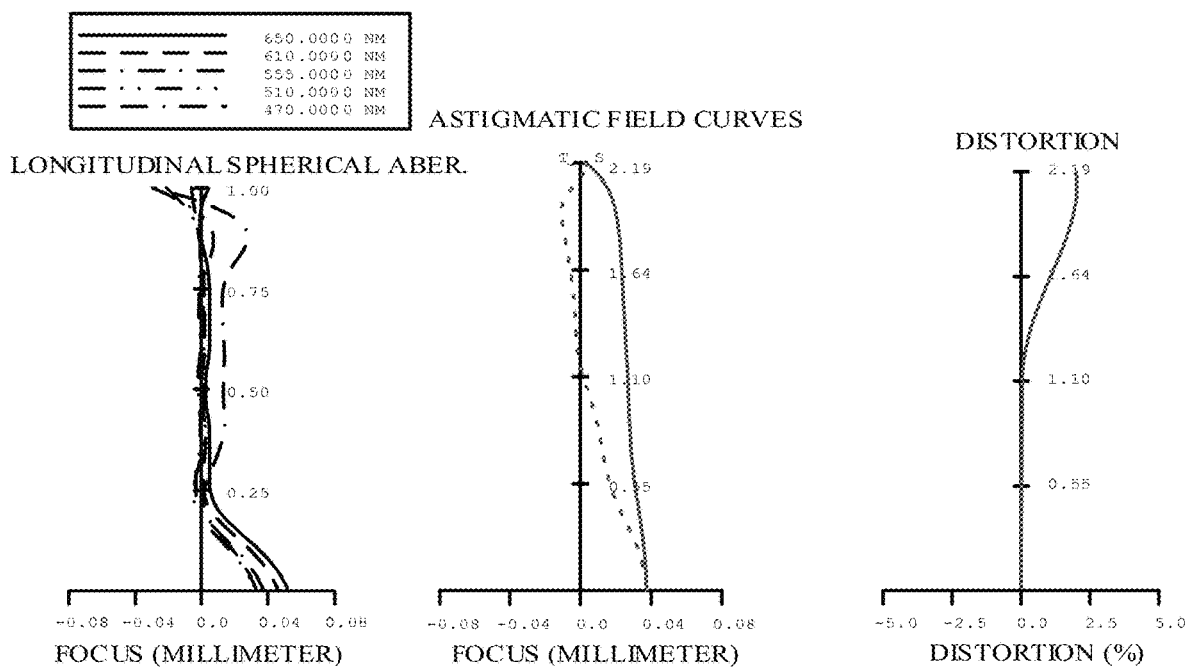
FIG. 5 illustrates a longitudinal spherical aberration curve, an astigmatic curve, and a distortion curve of the optical system according to the second implementation of this disclosure.

FIG. 5 shows the longitudinal spherical aberration curve, the astigmatic curve, and the distortion curve of the optical system according to the second implementation The longitudinal spherical aberration curve represents that the converging point of rays with different wavelengths deviates after the rays go through the lenses of the optical system. The astigmatic curve represents meridional image plane bending and sagittal image plane bending. The distortion curve represents the distortion values corresponding to dif- TABLE 2b

| Surface number | K | A4 | A6 | A8 | A10 |
|---|---|---|---|---|---|
| S1 | −1.730E+00 | 3.554E−02 | −1.308E−02 | 3.680E−02 | −5.694E−02 |
| S2 | −6.668E+00 | −9.563E−02 | 2.552E−01 | −3.859E−01 | 4.447E−01 |
| S3 | −1.118E+01 | −8.302E−02 | 2.198E−01 | −4.885E−01 | 9.325E−01 |
| S4 | 3.190E+00 | −1.161E−02 | 2.245E−01 | −1.631E+00 | 5.124E+00 |
| S5 | −1.300E+01 | −7.157E−02 | 3.716E−01 | −2.113E+00 | 6.613E+00 |
| S6 | −8.250E+00 | −6.067E−02 | 3.861E−01 | −2.021E+00 | 7.226E+00 |
| S7 | 1.009E+01 | −1.073E−01 | 4.459E−02 | 7.128E−01 | −2.668E+00 |
| S8 | −4.083E+00 | −7.602E−02 | 1.731E−01 | 4.379E−01 | −3.959E−01 |
| S9 | −1.364E+01 | −3.496E−02 | −9.820E−02 | 2.114E−01 | −2.815E−01 |
| S10 | 4.422E+00 | 3.985E−02 | −2.371E−01 | 2.997E−01 | −2.726E−01 |
| S11 | 6.571E−01 | 1.275E−01 | −3.031E−01 | 2.705E−01 | −1.538E−01 |
| S12 | 2.756E+00 | 2.527E−02 | −9.362E−02 | 5.901E−02 | −1.293E−02 |

| Surface number | A12 | A14 | A16 | A18 | A20 |
|---|---|---|---|---|---|
| S1 | 5.587E−02 | −3.465E−02 | 1.320E−02 | −2.840E−03 | 2.600E−04 |
| S2 | −3.970E−01 | 2.482E−01 | −9.855E−02 | 2.202E−02 | −2.100E−03 |
| S3 | −1.226E+00 | 1.009E+00 | −4.921E−01 | 1.301E−01 | −1.437E−02 |
| S4 | −9.311E+00 | 1.051E+01 | −7.294E+00 | 2.882E+00 | −5.009E−01 |
| S5 | −1.231E+01 | 1.435E+01 | −1.029E+01 | 4.166E+00 | −7.364E−01 |
| S6 | −1.577E+01 | 2.169E+01 | −1.831E+01 | 8.668E+00 | −1.769E+00 |
| S7 | 5.491E+00 | −7.086E+00 | 5.570E+00 | −2.437E+00 | 4.520E−01 |
| S8 | 6.996E−01 | −6.911E−01 | 3.745E−01 | −1.030E−01 | 1.132E−02 |
| S9 | 2.338E−01 | −1.183E−01 | 3.747E−02 | −7.190E−03 | 6.500E−04 |
| S10 | 1.799E−01 | −8.353E−02 | 2.647E−02 | −5.040E−03 | 4.200E−04 |
| S11 | 6.748E−02 | −2.173E−02 | 4.560E−03 | −5.400E−04 | 3.000E−05 |
| S12 | −1.220E−03 | 1.040E−03 | −1.500E−04 | 0.000E+00 | 0.000E+00 | ferent angles of view. As can be seen in FIG. 5, the optical system in the second implementation has high imaging quality.

Third Implementation

Figure 6:
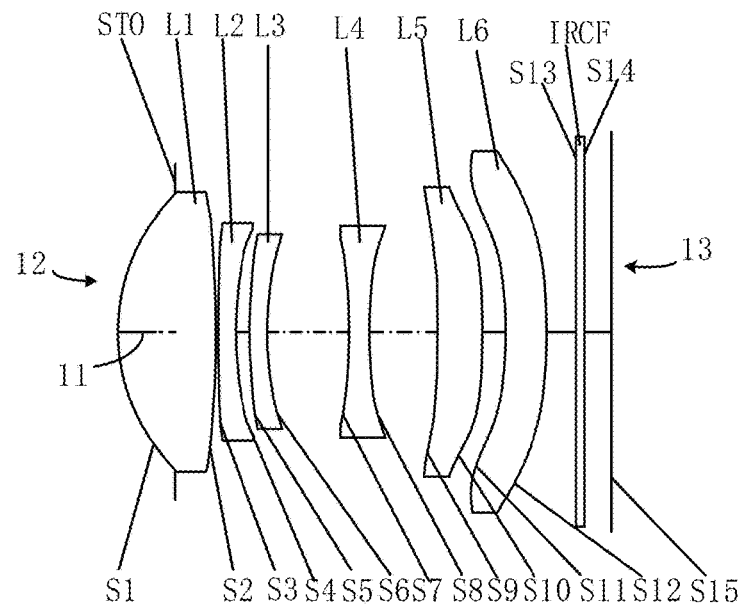
FIG. 6 is a schematic structural diagram of an optical system according to a third implementation of this disclosure.

In FIG. 6, the straight line 11 represents the optical axis. The side of the first lens L1 away from the second lens L2 is the object side 12 of the first lens L1. The side of the sixth lens L6 away from the fifth lens L5 is the image side 13 of the sixth lens L6. The optical system of this implementation includes, from the object side 12 to the image side 13, the stop STO, the first lens L1, the second lens L2, the third lens L3, the fourth lens L4, the fifth lens L5, the sixth lens L6, and the IRCF.

The first lens L1 with the positive refractive power is made of plastic. The object-side surface S1 is convex at the optical axis and at the circumference. The image-side surface S2 is convex at the optical axis and at the circumference. Both the object-side surface S1 and the image-side surface S2 of the first lens L1 are aspheric.

The second lens L2 with the negative refractive power is made of plastic. The object-side surface S3 is convex at the optical axis and at the circumference. The image-side surface S4 is concave at the optical axis and at the circumference. Both the object-side surface S3 and the image-side surface S4 of the second lens L2 are aspheric.

The third lens L3 with the negative refractive power is made of plastic. The object-side surface S5 is convex at the optical axis and at the circumference. The image-side surface S6 is concave at the optical axis and at the circumference. Both the object-side surface S5 and the image-side surface S6 of the third lens L3 are aspheric.

The fourth lens L4 with the negative refractive power is made of plastic. The object-side surface S7 is concave at the optical axis and at the circumference. The image-side surface S8 is concave at the optical axis and at the circumference. Both the object-side surface S7 and the image-side surface S8 of the fourth lens L4 are aspheric.

The fifth lens L5 with the positive refractive power is made of plastic. The object-side surface S9 is convex at the optical axis and concave at the circumference. The image-side surface S10 is convex at the optical axis and at the circumference. Both the object-side surface S9 and the image-side surface S10 of the fifth lens L5 are aspheric.

The sixth lens L6 with the negative refractive power is made of plastic. The object-side surface S11 is concave at the optical axis and at the circumference. The image-side surface S12 is convex at the optical axis and at the circumference. Both the object-side surface S11 and the image-side surface S12 of the sixth lens L6 are aspheric.

The stop STO can be located between the object side of the optical system and the sixth lens L6. In this implementation, the stop STO is disposed at one side of the first lens L1 away from the second lens L2 to control the amount of light entered.

The IRCF is disposed after the sixth lens L6. The IRCF has the object-side surface S13 and the image-side surface S14. The IRCF is made of glass, The IRCF is configured to filter out infrared rays so as to make the rays incident onto the imaging surface visible. Visible light has the wavelength ranging from 380 nm to 780 nm.

The imaging surface S15 is the surface where the image formed by the light of the photographed object after going through the optical system is located.

Table 3a illustrates the characteristics of the optical system in this disclosure where, the radius of curvature in this implementation is the radius of curvature of each of the lenses at the optical axis.

TABLE 3a

Third implementation
f = 7.5 mm, FNO = 2.44, FOV = 30.02°, TTL = 6.4 mm

| Surface number | Surface name | Surface type | Radius of curvature (mm) | Thickness (mm) | Material | Refractive index | Abbe number | Focal length (mm) |
| --- | --- | --- | --- | --- | --- | --- | --- | --- |
| Object surface | Object surface | spheric | Infinity | Infinity | | | | |
| STO | Stop | aspheric | Infinity | −0.741 | | | | |
| S1 | First | aspheric | 1.828 | 1.268 | plastic | 1.54 | 56.14 | 3.04 |
| S2 | lens | aspheric | −13.479 | 0.030 | | | | |
| S3 | Second | aspheric | 12.393 | 0.230 | plastic | 1.66 | 20.35 | −7.44 |
| S4 | lens | aspheric | 3.517 | 0.182 | | | | |
| S5 | Third | aspheric | 4.249 | 0.230 | plastic | 1.64 | 23.54 | −14.92 |
| S6 | lens | aspheric | 2.885 | 1.056 | | | | |
| S7 | Fourth | aspheric | −8.597 | 0.267 | plastic | 1.54 | 56.14 | −5.26 |
| S8 | lens | aspheric | 4.364 | 0.880 | | | | |
| S9 | Fifth | aspheric | 990.000 | 0.579 | plastic | 1.64 | 23.54 | 13.41 |
| S10 | lens | aspheric | −8.717 | 0.303 | | | | |
| S11 | Sixth | aspheric | −3.484 | 0.110 | plastic | 1.54 | 56.14 | −19.40 |
| S12 | lens | aspheric | −5.473 | 0.350 | | | | |
| S13 | Infrared | spheric | Infinity | 0.110 | glass | | | |
| S14 | cut filter | spheric | Infinity | 0.350 | | | | |
| S15 | Imaging surface | spheric | Infinity | 0.000 | | | | |

Note:
a reference wavelength is 555 nm

In Table 3a, f represents the effective focal length of the optical system, FNO represents the f-number of the optical system, FOV represents the angle of view of the optical system diagonally, and TTL represents the distance on the optical axis from the object-side surface of the first lens to the imaging surface of the optical system.

Table 3b shows high-order coefficients A4, A6, A8, A10, A12, A14, A16, A18, and A20 which are applicable to each of the aspheric lens surfaces S1, S2, S3, S4, S5, S6, S7, S8, S9, S10, S11, and S12 of the third implementation.

TABLE 3b

| Surface number | K | A4 | A6 | A8 | A10 |
|---|---|---|---|---|---|
| S1 | −1.729E+00 | 3.546E−02 | −1.336E−02 | 3.832E−02 | −5.991E−02 |
| S2 | −8.300E+00 | −8.600E−02 | 1.895E−01 | −1.896E−01 | 1.314E−01 |
| S3 | −1.181E+01 | −7.143E−02 | 1.189E−01 | −2.115E−01 | 5.983E−01 |
| S4 | 3.421E+00 | −2.470E−03 | 1.167E−01 | −1.344E+00 | 4.873E+00 |
| S5 | −1.173E+01 | −6.261E−02 | 2.909E−01 | −1.961E+00 | 6.816E+00 |
| S6 | −9.101E+00 | −5.617E−02 | 3.576E−01 | −2.047E+00 | 7.742E+00 |
| S7 | 1.170E+01 | −1.186E−01 | 2.941E−02 | 8.365E−01 | −3.097E+00 |
| S8 | −7.245E+00 | −8.248E−02 | 1.663E−01 | 1.113E−01 | −6.183E−01 |
| S9 | −1.364E+01 | −3.597E−02 | −9.496E−02 | 1.973E−01 | −2.581E−01 |
| S10 | 7.630E+00 | 3.894E−02 | −2.181E−01 | 2.356E−01 | −1.789E−01 |
| S11 | 6.389E−01 | 1.313E−01 | −2.822E−01 | 2.102E−01 | −8.942E−02 |
| S12 | 1.952E+00 | 2.873E−02 | −9.060E−02 | 4.884E−02 | −3.680E−03 |

| Surface number | A12 | A14 | A16 | A18 | A20 |
|---|---|---|---|---|---|
| S1 | 5.879E−02 | −3.612E−02 | 1.353E−02 | −2.840E−03 | 2.500E−04 |
| S2 | −1.042E−01 | 8.225E−02 | −4.229E−02 | 1.154E−02 | −1.280E−03 |
| S3 | −1.088E+00 | 1.094E+00 | −6.106E−01 | 1.788E−01 | −2.152E−02 |
| S4 | −9.378E+00 | 1.074E+01 | −7.382E+00 | 2.858E+00 | −4.863E−01 |
| S5 | −1.341E+01 | 1.602E+01 | −1.154E+01 | 4.639E+00 | −8.078E−01 |
| S6 | −1.736E+01 | 2.406E+01 | −2.023E+01 | 9.457E+00 | −1.896E+00 |
| S7 | 6.385E+00 | −8.237E+00 | 6.454E+00 | −2.804E+00 | 5.144E−01 |
| S8 | 1.133E+00 | −1.216E+00 | 7.578E−01 | −2.558E−01 | 3.670E−02 |
| S9 | 2.123E−01 | −1.058E−01 | 3.268E−02 | −6.040E−03 | 5.200E−04 |
| S10 | 9.868E−02 | −3.879E−02 | 1.121E−02 | −2.130E−03 | 1.900E−04 |
| S11 | 3.074E−02 | −9.350E−03 | 2.060E−03 | −2.600E−04 | 1.000E−05 |
| S12 | −4.990E−03 | 1.630E−03 | −1.000E−04 | −3.000E−05 | 0.000E+00 |

Figure 7:
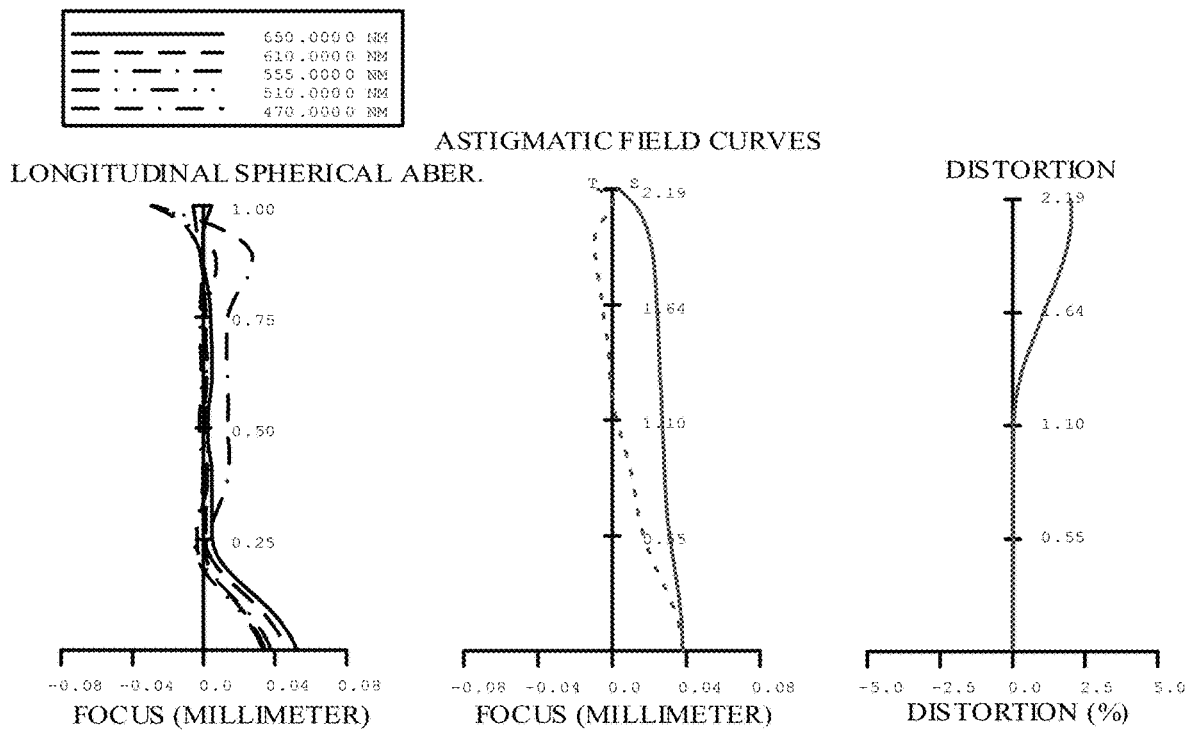
FIG. 7 illustrates a longitudinal spherical aberration curve, an astigmatic curve, and a distortion curve of the optical system according to the third implementation of this disclosure.

FIG. 7 shows the longitudinal spherical aberration curve, the astigmatic curve, and the distortion curve of the optical system according to the third implementation. The longitudinal spherical aberration curve represents that the converging point of rays with different wavelengths deviates after the rays go through the lenses of the optical system. The astigmatic curve represents meridional image plane bending and sagittal image plane bending. The distortion curve represents the distortion values corresponding to different angles of view. As can be seen in FIG. 7, the optical system in the third implementation has high imaging quality.

Fourth Implementation

Figure 8:
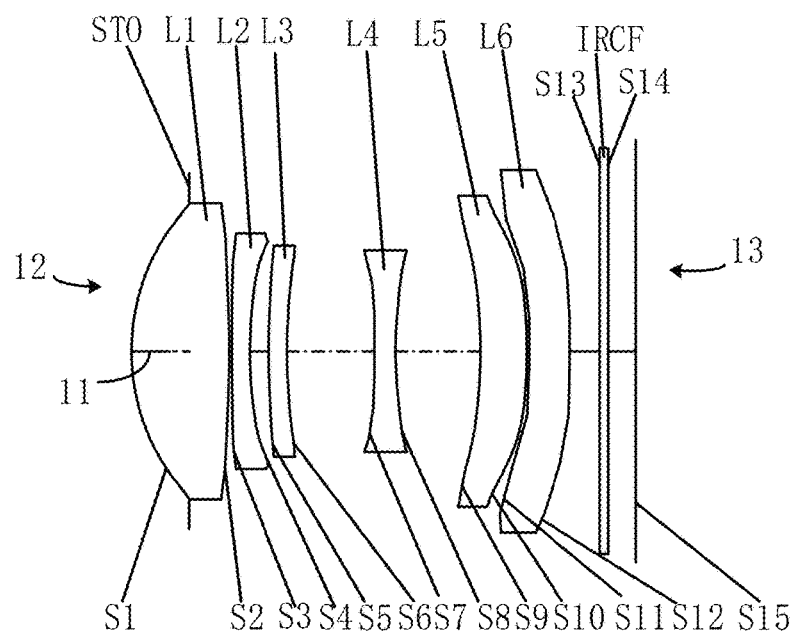
FIG. 8 is a schematic structural diagram of an optical system according to a fourth implementation of this disclosure.

In FIG. 8, the straight line 11 represents the optical axis. The side of the first lens L1 away from the second lens L2 is the object side 12 of the first lens L1. The side of the sixth lens L6 away from the fifth lens L5 is the image side 13 of the sixth lens L6. The optical system of this implementation includes, from the object side 12 to the image side 13, the stop STO, the first lens L1, the second lens L2, the third lens L3, the fourth lens L4, the fifth lens L5, the sixth lens L6, and the IRCF.

The first lens L1 with the positive refractive power is made of plastic. The object-side surface S1 is convex at the optical axis and at the circumference. The image-side surface S2 is convex at the optical axis and at the circumference. Both the object-side surface S1 and the image-side surface S2 of the first lens L1 are aspheric.

The second lens L2 with the negative refractive power is made of plastic. The object-side surface S3 is convex at the optical axis and at the circumference. The image-side surface S4 is concave at the optical axis and at the circumference. Both the object-side surface S3 and the image-side surface S4 of the second lens L2 are aspheric.

The third lens L3 with the negative refractive power is made of plastic. The object-side surface S5 is convex at the optical axis and concave at the circumference. The image-side surface S6 is concave at the optical axis and at the circumference. Both the object-side surface S5 and the image-side surface S6 of the third lens L3 are aspheric.

The fourth lens L4 with the negative refractive power is made of plastic. The object-side surface S7 is convex at the optical axis and at the circumference. The image-side surface S8 is concave at the optical axis and at the circumference. Both the object-side surface S7 and the image-side surface S8 of the fourth lens L4 are aspheric.

The fifth lens L5 with the positive refractive power is made of plastic. The object-side surface S9 is concave at the optical axis and at the circumference. The image-side surface S10 is convex at the optical axis and at the circumference. Both the object-side surface S9 and the image-side surface S10 of the fifth lens L5 are aspheric.

The sixth lens L6 with the negative refractive power is made of plastic. The object-side surface S11 is concave at the optical axis and at the circumference. The image-side surface S12 is concave at the optical axis and convex at the circumference. Both the object-side surface S11 and the image-side surface S12 of the sixth lens L6 are aspheric.

The stop STO can be located between the object side of the optical system and the sixth lens L6. In this implementation, the stop STO is disposed at one side of the first lens L1 away from the second lens L2 to control the amount of light entered.

The IRCF is made of glass. The IRCF is disposed after the sixth lens L6. The IRCF has the object-side surface S13 and the image-side surface S14. The IRCF is configured to filter out infrared rays so as to make the rays incident onto the imaging surface visible. Visible light has the wavelength ranging from 380 nm to 780 nm.

The imaging surface S15 is the surface where the image formed by the light of the photographed object after going through the optical system is located.

Table 4a illustrates the characteristics of the optical system in this disclosure, where the radius of curvature in this implementation is the radius of curvature of each of the lenses at the optical axis.

TABLE 4a

Fourth implementation
f = 7.5 mm, FNO = 2.44, FOV = 30.02°, TTL = 6.4 mm

| Surface number | Surface name | Surface type | Radius of curvature (mm) | Thickness (mm) | Material | Refractive index | Abbe number | Focal length (mm) |
|---|---|---|---|---|---|---|---|---|
| Object surface | Object surface | spheric | Infinity | Infinity | | | | |
| STO | Stop | aspheric | Infinity | −0.729 | | | | |
| S1 | First | aspheric | 1.875 | 1.236 | plastic | 1.54 | 56.14 | 3.14 |
| S2 | lens | aspheric | −15.418 | 0.033 | | | | |
| S3 | Second | aspheric | 12.469 | 0.230 | plastic | 1.66 | 20.35 | −8.11 |
| S4 | lens | aspheric | 3.746 | 0.246 | | | | |
| S5 | Third | aspheric | 7.572 | 0.230 | plastic | 1.64 | 23.54 | −15.93 |
| S6 | lens | aspheric | 4.306 | 1.107 | | | | |
| S7 | Fourth | aspheric | 14.658 | 0.267 | plastic | 1.54 | 56.14 | −6.57 |
| S8 | lens | aspheric | 2.864 | 1.075 | | | | |
| S9 | Fifth | aspheric | −4.525 | 0.587 | plastic | 1.64 | 23.54 | 138.03 |
| S10 | lens | aspheric | −4.525 | 0.030 | | | | |
| S11 | Sixth | aspheric | −25.024 | 0.518 | plastic | 1.54 | 56.14 | −30.47 |
| S12 | lens | aspheric | 49.959 | 0.380 | | | | |
| S13 | Infrared | spheric | Infinity | 0.110 | glass | | | |
| S14 | cut filter | spheric | Infinity | 0.350 | | | | |
| S15 | Imaging surface | spheric | Infinity | 0.000 | | | | |

Note:
a reference wavelength is 555 nm

In Table 4a, f represents the effective focal length of the optical system, FNO represents the f-number of the optical system, FOV represents the angle of view of the optical system diagonally, and TTL represents the distance on the optical axis from the object-side surface of the first lens to the imaging surface of the optical system.

Table 4b shows high-order coefficients A4, A6, A8, A10, A12, A14, A16, A18, and A20 which are applicable to each of the aspheric lens surfaces S1, S2, S3, S4, S5, S6, S7, S8, S9, S10, S11, and S12 of the fourth implementation.

TABLE 4b

| Surface number | K | A4 | A6 | A8 | A10 |
|---|---|---|---|---|---|
| S1 | −1.722E+00 | 3.363E−02 | −1.134E−02 | 3.511E−02 | −5.763E−02 |
| S2 | −8.224E+00 | −9.651E−02 | 2.771E−01 | −4.272E−01 | 4.893E−01 |
| S3 | −1.448E+01 | −1.271E−01 | 2.810E−01 | −3.962E−01 | 5.133E−01 |
| S4 | 4.656E+00 | −6.296E−02 | 1.821E−01 | −7.247E−01 | 2.334E+00 |
| S5 | 9.066E−01 | −8.102E−02 | 2.303E−01 | −9.190E−01 | 2.944E+00 |
| S6 | −1.313E+01 | −7.446E−02 | 2.117E−01 | −7.313E−01 | 2.227E+00 |
| S7 | 1.947E−01 | −2.501E−01 | 9.028E−02 | 4.611E−01 | −1.698E+00 |
| S8 | −5.542E+00 | −1.762E−01 | 1.992E−01 | 2.840E−03 | −1.948E−01 |
| S9 | −1.363E+01 | −5.980E−03 | −6.885E−02 | 1.896E−01 | −3.240E−01 |
| S10 | −2.303E+00 | 9.058E−02 | −4.749E−01 | 7.342E−01 | −6.912E−01 |
| S11 | 7.855E+00 | 4.068E−02 | −5.016E−01 | 6.667E−01 | −4.663E−01 |
| S12 | −1.138E+01 | −8.159E−02 | −1.176E−02 | −1.588E−02 | 6.340E−02 |

| Surface number | A12 | A14 | A16 | A18 | A20 |
|---|---|---|---|---|---|
| S1 | 5.913E−02 | −3.772E−02 | 1.456E−02 | −3.120E−03 | 2.800E−04 |
| S2 | −4.261E−01 | 2.588E−01 | −1.001E−01 | 2.186E−02 | −2.040E−03 |
| S3 | −5.534E−01 | 4.086E−01 | −1.817E−01 | 4.324E−02 | −4.160E−03 |
| S4 | −4.565E+00 | 5.544E+00 | −4.125E+00 | 1.742E+00 | −3.216E−01 |
| S5 | −5.787E+00 | 7.108E+00 | −5.368E+00 | 2.295E+00 | −4.303E−01 |
| S6 | −4.224E+00 | 4.928E+00 | −3.445E+00 | 1.310E+00 | −2.091E−01 |
| S7 | 3.634E+00 | −4.935E+00 | 4.014E+00 | −1.784E+00 | 3.292E−01 |
| S8 | 3.624E−01 | −3.861E−01 | 2.219E−01 | −6.540E−02 | 8.050E−03 |
| S9 | 3.162E−01 | −1.793E−01 | 5.979E−02 | −1.097E−02 | 8.600E−04 |

TABLE 4b-continued

| S10 | 4.179E−01 | −1.616E−01 | 3.894E−02 | −5.360E−03 | 3.200E−04 |
| S11 | 2.057E−01 | −5.875E−02 | 1.052E−02 | −1.070E−03 | 5.000E−05 |
| S12 | −5.131E−02 | 2.032E−02 | −4.470E−03 | 5.300E−04 | −3.000E−05 |

Figure 9:
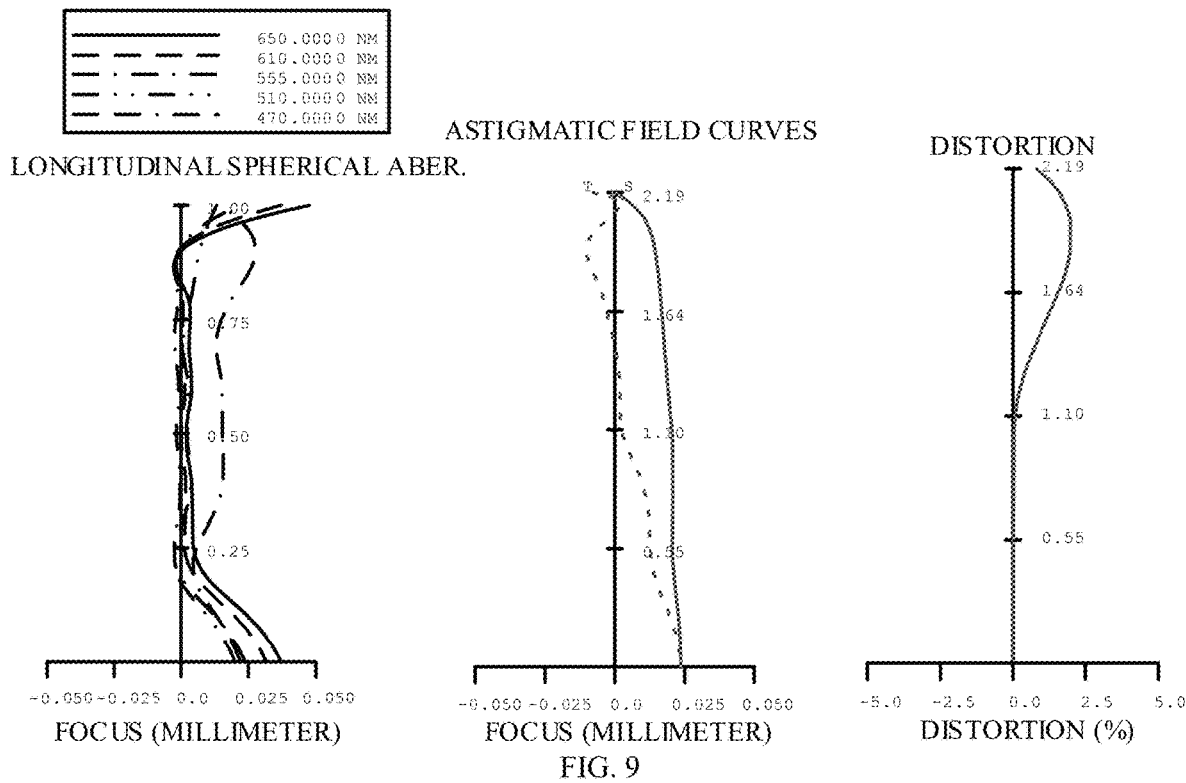
FIG. 9 illustrates a longitudinal spherical aberration curve, an astigmatic curve, and a distortion curve of the optical system according to the fourth implementation of this disclosure.

FIG. 9 shows the longitudinal spherical aberration curve, the astigmatic curve, and the distortion curve of the optical system according to the fourth implementation. The longitudinal spherical aberration curve represents that the converging point of rays with different wavelengths deviates after the rays go through the lenses of the optical system. The astigmatic curve represents meridional image plane bending and sagittal image plane bending. The distortion curve represents the distortion values corresponding to different angles of view. As can be seen in FIG. 9, the optical system in the fourth implementation has high imaging quality.

Fifth Implementation

Figure 10:
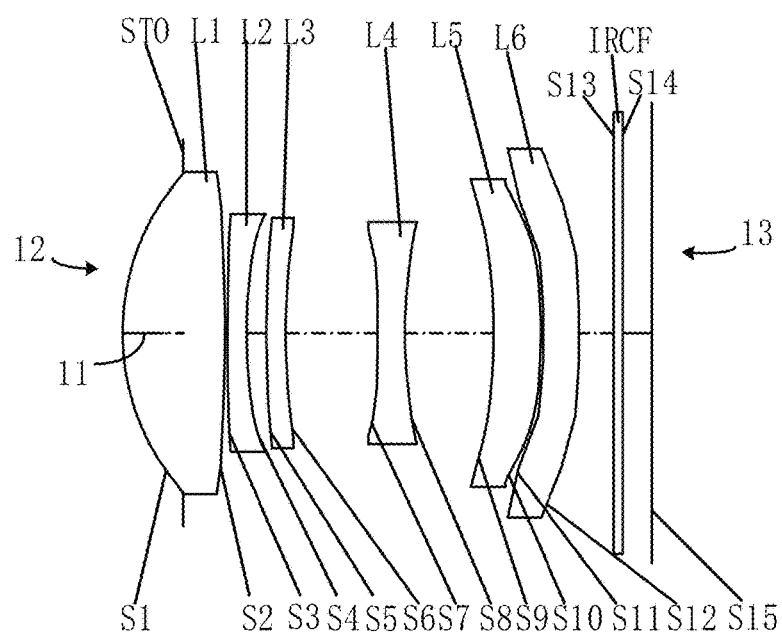
FIG. 10 is a schematic structural diagram of an optical system according to a fifth implementation of this disclosure.

In FIG. 10, the straight line 11 represents the optical axis. The side of the first lens L1 away from the second lens L2 is the object side 12 of the first lens L1. The side of the sixth lens L6 away from the fifth lens L5 is the image side 13 of the sixth lens L6. The optical system of this implementation includes, from the object side 12 to the image side 13, the stop STO, the first lens L1, the second lens L2, the third lens L3, the fourth lens L4, the fifth lens L5, the sixth lens L6, and the IRCF.

The first lens L1 with the positive refractive power is made of plastic. The object-side surface S1 is convex at the optical axis and at the circumference. The image-side surface S2 is convex at the optical axis and at the circumference. Both the object-side surface S1 and the image-side surface S2 of the first lens L1 are aspheric.

The second lens L2 with the negative refractive power is made of plastic. The object-side surface S3 is convex at the optical axis and at the circumference. The image-side surface S4 is concave at the optical axis and at the circumference. Both the object-side surface S3 and the image-side surface S4 of the second lens L2 are aspheric.

The third lens L3 with the negative refractive power is made of plastic. The object-side surface S5 is convex at the optical axis and concave at the circumference. The image-side surface S6 is concave at the optical axis and at the circumference. Both the object-side surface S5 and the image-side surface S6 of the third lens L3 are aspheric.

The fourth lens L4 with the negative refractive power is made of plastic. The object-side surface S7 is convex at the optical axis and concave at the circumference. The image-side surface S8 is concave at the optical axis and at the circumference. Both the object-side surface S7 and the image-side surface S8 of the fourth lens L4 are aspheric.

The fifth lens L5 with the negative refractive power is made of plastic. The object-side surface S9 is concave at the optical axis and at the circumference. The image-side surface S10 is convex at the optical axis and at the circumference. Both the object-side surface S9 and the image-side surface S10 of the fifth lens L5 are aspheric.

The sixth lens L6 with the positive refractive power is made of plastic. The object-side surface S11 is convex at the optical axis and concave at the circumference. The image-side surface S12 is convex at the optical axis and at the circumference. Both the object-side surface S11 and the image-side surface S12 of the sixth lens L6 are aspheric.

The stop STO can be located between the object side of the optical system and the sixth lens L6. In this implementation, the stop STO is disposed at one side of the first lens L1 away from the second lens L2 to control the amount of light entered.

The IRCF is made of glass. The IRCF is disposed after the sixth lens L6. The IRCF includes the object-side surface S13 and the image-side surface S14. The IRCF is configured to filter out infrared rays so as to make the rays incident onto the imaging surface visible. Visible light has the wavelength ranging from 380 nm to 780 nm.

The imaging surface S15 is the surface where the image formed by the light of the photographed object after going through the optical system is located.

Table 5a illustrates the characteristics of the optical system in this disclosure, where the radius of curvature in this implementation is the radius of curvature of each of the lenses at the optical axis.

TABLE 5a

Fifth implementation
f = 7.5 mm, FNO = 2.44, FOV = 30.01°, TTL = 6.4 mm

| Surface number | Surface name | Surface type | Radius of curvature (mm) | Thickness (mm) | Material | Refractive index | Abbe number | Focal length (mm) |
|---|---|---|---|---|---|---|---|---|
| Object surface | Object surface | spheric | Infinity | Infinity | | | | |
| STO | Stop | spheric | Infinity | −0.730 | | | | |
| S1 | First | aspheric | 1.872 | 1.236 | plastic | 1.54 | 56.14 | 3.14 |
| S2 | lens | aspheric | −15.759 | 0.030 | | | | |
| S3 | Second | aspheric | 12.359 | 0.230 | plastic | 1.66 | 20.35 | −8.12 |
| S4 | lens | aspheric | 3.738 | 0.247 | | | | |
| S5 | Third | aspheric | 7.583 | 0.232 | plastic | 1.64 | 23.54 | −15.82 |
| S6 | lens | aspheric | 4.296 | 1.106 | | | | |
| S7 | Fourth | aspheric | 13.527 | 0.331 | plastic | 1.54 | 56.14 | −6.11 |
| S8 | lens | aspheric | 2.653 | 1.074 | | | | |
| S9 | Fifth | aspheric | −4.500 | 0.566 | plastic | 1.64 | 23.54 | −119.83 |
| S10 | lens | aspheric | −5.014 | 0.030 | | | | |
| S11 | Sixth | aspheric | 800.000 | 0.440 | plastic | 1.54 | 56.14 | 449.14 |
| S12 | lens | aspheric | −353.446 | 0.418 | | | | |

TABLE 5a-continued

Fifth implementation
f = 7.5 mm, FNO = 2.44, FOV = 30.01°, TTL = 6.4 mm

| Surface number | Surface name | Surface type | Radius of curvature (mm) | Thickness (mm) | Material | Refractive index | Abbe number | Focal length (mm) |
|---|---|---|---|---|---|---|---|---|
| S13 | Infrared cut filter | spheric | Infinity | 0.110 | glass | | | |
| S14 | | spheric | Infinity | 0.350 | | | | |
| S15 | Imaging surface | spheric | Infinity | 0.000 | | | | |

Note:
a reference wavelength is 555 nm

In Table 5a, f represents the effective focal length of the optical system, FNO represents the f-number of the optical system, FOV represents the angle of view of the optical system diagonally, and TTL represents the distance on the optical axis from the object-side surface of the first lens to the imaging surface of the optical system.

Table 5b shows high-order coefficients A4, A6, A8, A10, A12, A14, A16, A18, and A20 which are applicable to each of the aspheric lens surfaces S1, S2, S3, S4, S5, S6, S7, S8, S9, S10, S11, and S12 of the fifth implementation.

TABLE 5b

| Surface number | K | A4 | A6 | A8 | A10 |
|---|---|---|---|---|---|
| S1 | −1.723E+00 | 3.371E−02 | −1.144E−02 | 3.520E−02 | −5.787E−02 |
| S2 | −8.300E+00 | −1.055E−01 | 3.401E−01 | −6.002E−01 | 7.392E−01 |
| S3 | −1.448E+01 | −1.386E−01 | 3.603E−01 | −6.023E−01 | 7.580E−01 |
| S4 | 4.686E+00 | −7.124E−02 | 2.262E−01 | −8.140E−01 | 2.359E+00 |
| S5 | 2.162E+00 | −8.936E−02 | 2.603E−01 | −9.441E−01 | 2.823E+00 |
| S6 | −1.313E+01 | −7.935E−02 | 2.191E−01 | −7.050E−01 | 2.049E+00 |
| S7 | −8.300E+00 | −2.338E−01 | 2.901E−02 | 4.857E−01 | −1.580E+00 |
| S8 | −6.777E+00 | −1.450E−01 | 1.251E−01 | 7.948E−02 | −2.733E−01 |
| S9 | −1.192E+01 | −2.500E−04 | −4.543E−02 | 7.914E−01 | −1.202E−01 |
| S10 | 1.643E+00 | 5.441E−02 | −3.890E−01 | 6.283E−01 | −6.779E−01 |
| S11 | −1.215E+01 | −4.534E−02 | −3.282E−01 | 3.407E−01 | −1.490E−01 |
| S12 | −1.138E+01 | −1.179E−01 | 7.702E−02 | −2.315E−01 | 3.475E−01 |

| Surface number | A12 | A14 | A16 | A18 | A20 |
|---|---|---|---|---|---|
| S1 | 5.995E−02 | −3.889E−02 | 1.533E−02 | −3.360E−03 | 3.100E−04 |
| S2 | −6.347E−01 | 3.623E−01 | −1.297E−01 | 2.628E−02 | −2.290E−03 |
| S3 | −6.569E−01 | 3.577E−01 | −1.092E−01 | 1.469E−02 | −2.000E−04 |
| S4 | −4.390E+00 | 5.286E+00 | −3.991E+00 | 1.721E+00 | −3.233E−01 |
| S5 | −5.317E+00 | 6.365E+00 | −4.758E+00 | 2.037E+00 | −3.850E−01 |
| S6 | −3.751E+00 | 4.213E+00 | −2.831E+00 | 1.031E+00 | −1.571E−01 |
| S7 | 3.095E+00 | −3.756E+00 | 2.604E+00 | −9.083E−01 | 1.073E−01 |
| S8 | 3.996E−01 | −3.248E−01 | 1.121E−01 | 1.070E−03 | −6.270E−03 |
| S9 | 9.380E−02 | −3.156E−02 | 2.840E−03 | 3.200E−04 | 1.000E−05 |
| S10 | 4.900E−01 | −2.248E−01 | 6.322E−02 | −1.015E−02 | 7.300E−04 |
| S11 | 4.965E−02 | −2.072E−02 | 6.950E−03 | −1.200E−03 | 8.000E−05 |
| S12 | −2.613E−01 | 1.123E−01 | −2.835E−02 | 3.930E−03 | −2.300E−04 |

Figure 11:
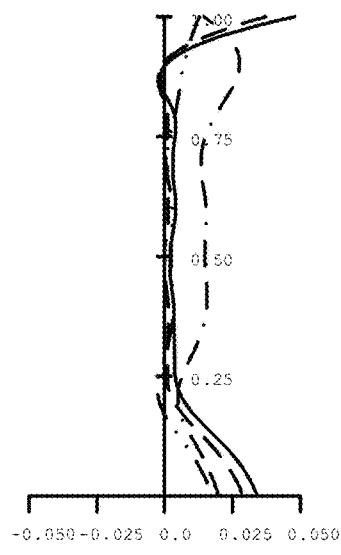
FIG. 11 illustrates a longitudinal spherical aberration curve, an astigmatic curve, and a distortion curve of the optical system according to the fifth implementation of this disclosure.
Figure 11:
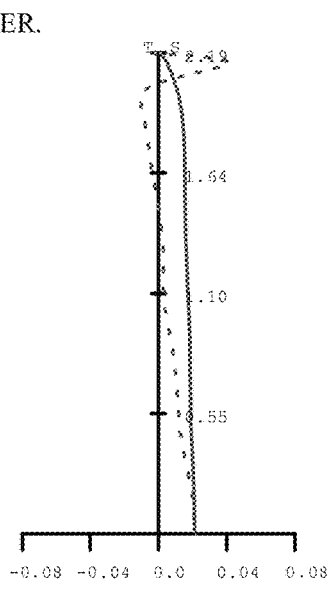
Figure 11:
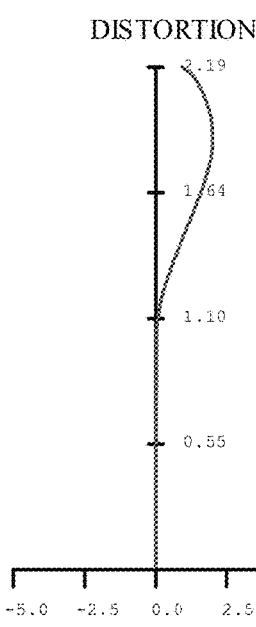

FIG. 11 shows the longitudinal spherical aberration curve, the astigmatic curve, and the distortion curve of the optical system according to the fifth implementation. The longitudinal spherical aberration curve represents that the converging point of rays with different wavelengths deviates after the rays go through the lenses of the optical system. The astigmatic curve represents meridional image plane bending and sagittal image plane bending. The distortion curve represents the distortion values corresponding to different angles of view. As can be seen in FIG. 11, the optical system in the fifth implementation has high imaging quality.

Sixth Implementation

Figure 12:
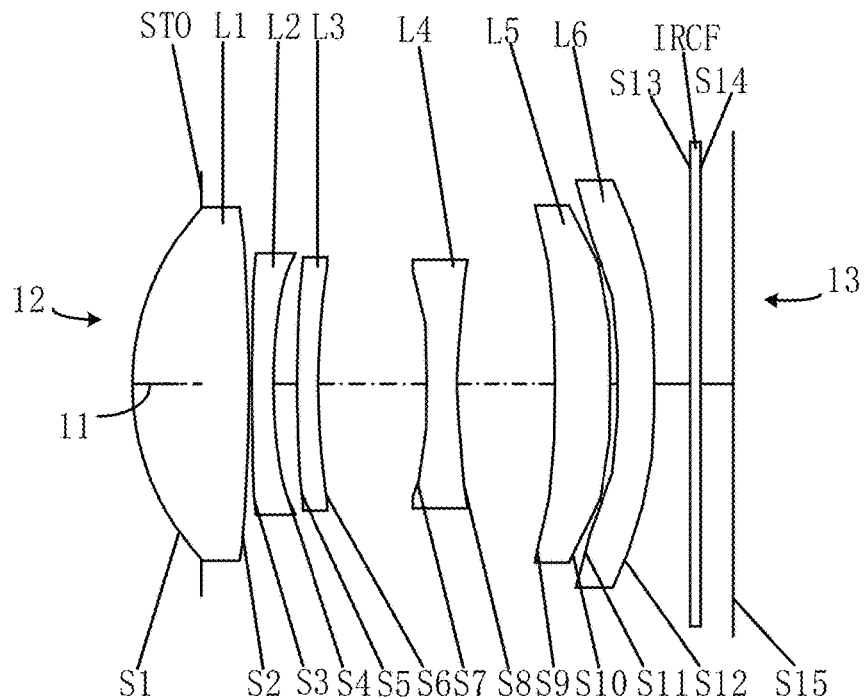
FIG. 12 is a schematic structural diagram of an optical system according to a sixth implementation of this disclosure.

In FIG. 12, the straight line 11 represents the optical axis. The side of the first lens L1 away from the second lens L2 is the object side 12 of the first lens L1. The side of the sixth lens L6 away from the fifth lens L5 is the image side 13 of the sixth lens L6. The optical system of this implementation includes, from the object side 12 to the image side 13, the stop STO, the first lens L1, the second lens L2, the third lens L3, the fourth lens L4, the fifth lens L5, the sixth lens L6, and the IRCF.

The first lens L1 with the positive refractive power is made of plastic. The object-side surface S1 is convex at the optical axis and at the circumference. The image-side surface S2 is convex at the optical axis and at the circumference. Both the object-side surface S1 and the image-side surface S2 of the first lens L1 are aspheric.

The second lens L2 with the negative refractive power is made of plastic. The object-side surface S3 is convex at the optical axis and at the circumference. The image-side surface S4 is concave at the optical axis and at the circumference. Both the object-side surface S3 and the image-side surface S4 of the second lens L2 are aspheric.

The third lens L3 with the negative refractive power is made of plastic. The object-side surface S5 is convex at the optical axis and concave at the circumference. The image-side surface S6 is concave at the optical axis and at the circumference. Both the object-side surface S5 and the image-side surface S6 of the third lens L3 are aspheric.

The fourth lens L4 with the negative refractive power is made of plastic. The object-side surface S7 is convex at the optical axis and concave at the circumference. The image-side surface S8 is concave at the optical axis and at the circumference. Both the object-side surface S7 and the image-side surface S8 of the fourth lens L4 are aspheric.

The fifth lens L5 with the negative refractive power is made of plastic. The object-side surface S9 is concave at the optical axis and at the circumference. The image-side surface S10 is concave at the optical axis and convex at the circumference. Both the object-side surface S9 and the image-side surface S10 of the fifth lens L5 are aspheric.

The sixth lens L6 with the positive refractive power is made of plastic. The object-side surface S11 is convex at the optical axis and concave at the circumference. The image-side surface S12 is convex at the optical axis and at the circumference. Both the object-side surface S11 and the image-side surface S12 of the sixth lens L6 are aspheric.

The stop STO can be located between the object side of the optical system and the sixth lens L6. In this implementation, the stop STO is disposed at one side of the first lens L1 away from the second lens L2 to control the amount of light entered.

The IRCF is made of glass. The IRCF is disposed after the sixth lens L6. The IRCF includes the object-side surface S13 and the image-side surface S14. The IRCF is configured to filter out infrared rays so as to make the rays incident onto the imaging surface visible. Visible light has the wavelength ranging from 380 nm to 780 nm.

The imaging surface S15 is the surface where the image formed by the light of the photographed object after going through the optical system is located.

Table 6a illustrates the characteristics of the optical system in this disclosure, where the radius of curvature in this implementation is the radius of curvature of each of the lenses at the optical axis.

TABLE 6a

Sixth implementation

EFL = 7.5 mm, FNO = 2.44, FOV = 29.97°, TTL = 6.4 mm

| Surface number | Surface name | Surface type | Radius of curvature (mm) | Thickness (mm) | Material | Refractive index | Abbe number | Focal length (mm) |
| --- | --- | --- | --- | --- | --- | --- | --- | --- |
| Object surface | Object surface | spheric | Infinity | Infinity | | | | |
| STO | Stop | aspheric | Infinity | −0.729 | | | | |
| S1 | First | aspheric | 1.871 | 1.238 | plastic | 1.54 | 56.14 | 3.13 |
| S2 | lens | aspheric | −14.815 | 0.030 | | | | |
| S3 | Second | aspheric | 11.778 | 0.230 | plastic | 1.66 | 20.35 | −8.14 |
| S4 | lens | aspheric | 3.686 | 0.252 | | | | |
| S5 | Third | aspheric | 7.960 | 0.230 | plastic | 1.64 | 23.54 | −14.71 |
| S6 | lens | aspheric | 4.278 | 1.152 | | | | |
| S7 | Fourth | aspheric | 20.307 | 0.325 | plastic | 1.54 | 56.14 | −5.32 |
| S8 | lens | aspheric | 2.528 | 1.037 | | | | |
| S9 | Fifth | aspheric | −41.615 | 0.597 | plastic | 1.64 | 23.54 | −61.96 |
| S10 | lens | aspheric | 996.000 | 0.080 | | | | |
| S11 | Sixth | aspheric | 377.713 | 0.389 | plastic | 1.54 | 56.14 | 31.62 |
| S12 | lens | aspheric | −18.083 | 0.380 | | | | |
| S13 | Infrared | spheric | Infinity | 0.110 | glass | | | |
| S14 | cut filter | spheric | Infinity | 0.350 | | | | |
| S15 | Imaging surface | spheric | Infinity | 0.000 | | | | |

Note:
a reference wavelength is 555 nm

In Table 6a, f represents the effective focal length of the optical system, FNO represents the f-number of the optical system, FOV represents the angle of view of the optical system diagonally, and TTL represents the distance on the optical axis from the object-side surface of the first lens to the imaging surface of the optical system.

Table 6b shows high-order coefficients A4, A6, A8, A10, A12, A14, A16, A18, and A20 which are applicable to each of the aspheric lens surfaces S1, S2, S3, S4, S5, S6, S7, S8, S9, S10, S11, and S12 of the sixth implementation.

TABLE 6b

| Surface number | K | A4 | A6 | A8 | A10 |
|---|---|---|---|---|---|
| S1 | −1.726E+00 | 3.389E−02 | −1.178E−02 | 3.450E−02 | −5.491E−02 |
| S2 | −6.202E+00 | −1.059E−01 | 3.568E−01 | −6.566E−01 | 8.226E−01 |
| S3 | −1.281E+01 | −1.463E−01 | 4.043E−01 | −6.865E−01 | 8.183E−01 |
| S4 | 4.668E+00 | −8.975E−02 | 2.949E−01 | −9.015E−01 | 2.376E+00 |
| S5 | 1.053E+00 | −1.171E−01 | 3.614E−01 | −1.111E+00 | 2.983E+00 |
| S6 | −1.313E+01 | −1.012E−01 | 3.201E−01 | −1.006E+00 | 2.747E+00 |
| S7 | −7.086E+00 | −3.100E−01 | 8.096E−02 | 7.476E−01 | −3.118E+00 |
| S8 | −8.407E+00 | −2.275E−01 | 2.677E−01 | −1.816E−01 | 1.012E−01 |
| S9 | −1.258E+01 | −6.822E−02 | 8.695E−02 | −1.756E−01 | 2.248E−01 |
| S10 | −1.231E+01 | −1.830E−01 | 1.874E−01 | −2.058E−01 | 8.817E−02 |
| S11 | −1.215E+01 | −2.244E−01 | 1.634E−01 | −2.430E−01 | 2.727E−01 |
| S12 | 5.462E+00 | −9.558E−02 | 3.976E−02 | −1.424E−01 | 2.501E−01 |

| Surface number | A12 | A14 | A16 | A18 | A20 |
|---|---|---|---|---|---|
| S1 | 5.526E−02 | −3.495E−02 | 1.348E−02 | −2.900E−03 | 2.600E−04 |
| S2 | −7.042E−01 | 3.969E−01 | −1.398E−01 | 2.781E−02 | −2.380E−03 |
| S3 | −6.284E−01 | 2.706E−01 | −4.208E−02 | −8.810E−03 | 3.010E−03 |
| S4 | −4.292E+00 | 5.166E+00 | −3.953E+00 | 1.732E+00 | −3.289E−01 |
| S5 | −5.374E+00 | 6.310E+00 | −4.695E+00 | 2.016E+00 | −3.823E−01 |
| S6 | −4.970E+00 | 5.712E+00 | −4.051E+00 | 1.620E+00 | −2.817E−01 |
| S7 | 7.309E+00 | −1.049E+01 | 8.995E+00 | −4.246E+00 | 8.482E−01 |
| S8 | 5.636E−02 | −1.850E−01 | 1.626E−01 | −7.265E−02 | 1.466E−02 |
| S9 | −2.067E−01 | 1.319E−01 | −5.105E−02 | 1.034E−02 | −8.100E−04 |
| S10 | 2.223E−02 | −3.813E−02 | 1.719E−02 | −3.840E−03 | 3.600E−04 |
| S11 | −1.687E−01 | 6.348E−02 | −1.544E−02 | 2.320E−03 | −1.600E−04 |
| S12 | −2.014E−01 | 8.957E−02 | −2.301E−02 | 3.220E−03 | −1.900E−04 |

Figure 13:
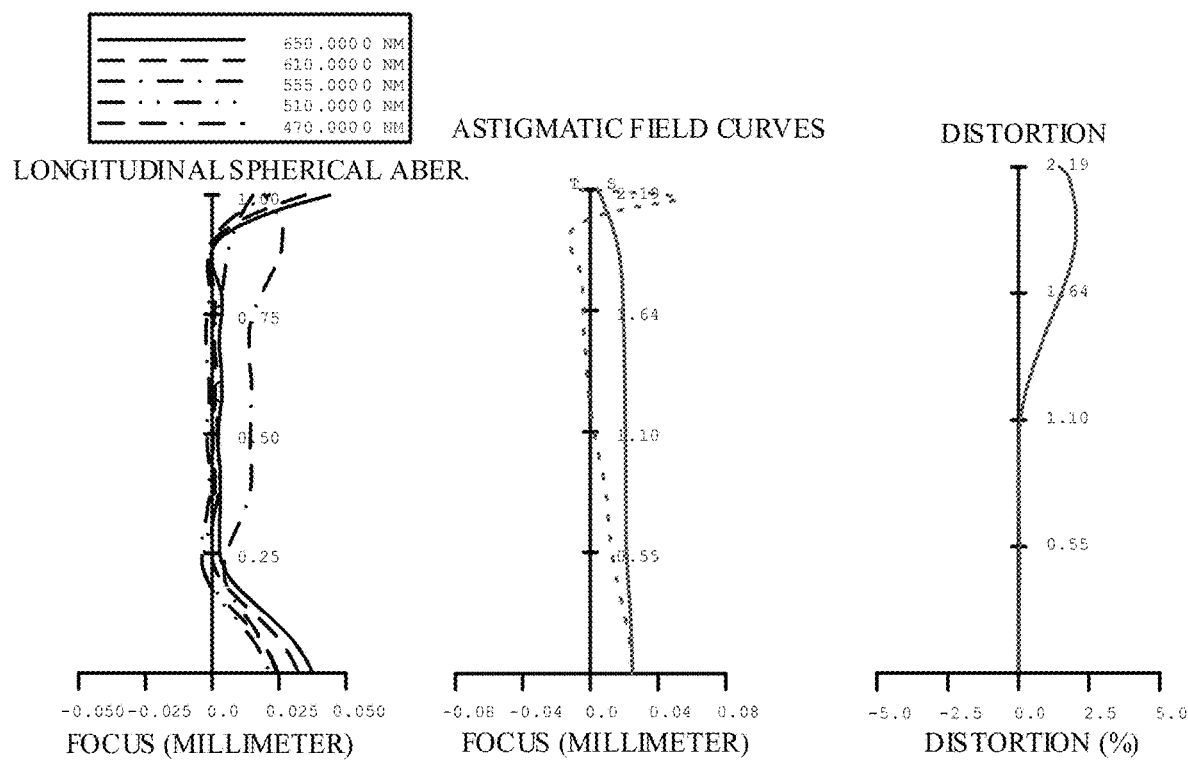
FIG. 13 illustrates a longitudinal spherical aberration curve, an astigmatic curve, and a distortion curve of the optical system according to the sixth implementation of this disclosure.

FIG. 13 shows the longitudinal spherical aberration curve, the astigmatic curve, and the distortion curve of the optical system according to the sixth implementation. The longitudinal spherical aberration curve represents that the converging point of rays with different wavelengths deviates after the rays go through the lenses of the optical system. The astigmatic curve represents meridional image plane bending and sagittal image plane bending. The distortion curve represents the distortion values corresponding to different angles of view. As can be seen in FIG. 13, the optical system in the sixth implementation has high imaging quality.

Seventh Implementation

Figure 14:
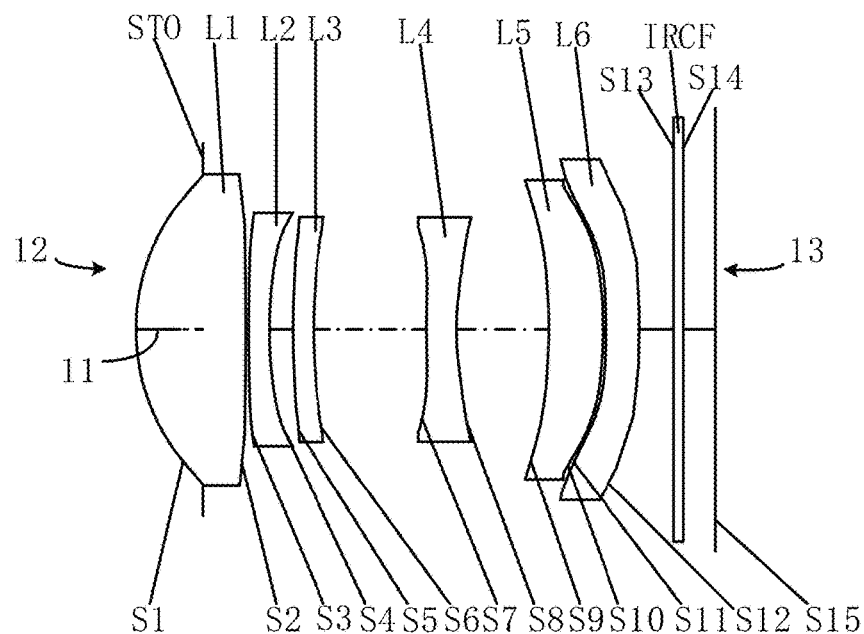
FIG. 14 is a schematic structural diagram of an optical system according to a seventh implementation of this disclosure.

In FIG. 14, the straight line 11 represents the optical axis. The side of the first lens L1 away from the second lens L2 is the object side 12 of the first lens L1. The side of the sixth lens L6 away from the fifth lens L5 is the image side 13 of the sixth lens L6. The optical system of this implementation includes, from the object side 12 to the image side 13, the stop STO, the first lens L1, the second lens L2, the third lens L3, the fourth lens L4, the fifth lens L5, the sixth lens L6, and the IRCF.

The first lens L1 with the positive refractive power is made of plastic. The object-side surface S1 is convex at the optical axis and at the circumference. The image-side surface S2 is concave at the optical axis and convex at the circumference. Both the object-side surface S1 and the image-side surface S2 of the first lens L1 are aspheric.

The second lens L2 with the negative refractive power is made of plastic. The object-side surface S3 is convex at the optical axis and at the circumference. The image-side surface S4 is concave at the optical axis and at the circumference. Both the object-side surface S3 and the image-side surface S4 of the second lens L2 are aspheric.

The third lens L3 with the negative refractive power is made of plastic. The object-side surface S5 is convex at the optical axis and concave at the circumference. The image-side surface S6 is concave at the optical axis and at the circumference. Both the object-side surface S5 and the image-side surface S6 of the third lens L3 are aspheric.

The fourth lens L4 with the negative refractive power is made of plastic. The object-side surface S7 is convex at the optical axis and concave at the circumference. The image-side surface S8 is concave at the optical axis and at the circumference. Both the object-side surface S7 and the image-side surface S8 of the fourth lens L4 are aspheric.

The fifth lens L5 with the positive refractive power is made of plastic. The object-side surface S9 is concave at the optical axis and at the circumference. The image-side surface S10 is convex at the optical axis and at the circumference. Both the object-side surface S9 and the image-side surface S10 of the fifth lens L5 are aspheric.

The sixth lens L6 with the negative refractive power is made of plastic. The object-side surface S11 is concave at the optical axis and at the circumference. The image-side surface S12 is convex at the optical axis and at the circumference. Both the object-side surface S11 and the image-side surface S12 of the sixth lens L6 are aspheric.

The stop STO can be located between the object side of the optical system and the sixth lens L6. In this implementation, the stop STO is disposed at one side of the first lens L1 away from the second lens L2 to control the amount of light entered or received.

The IRCF is made of glass. The IRCF is disposed after the sixth lens L6. The IRCF includes the object-side surface S13 and the image-side surface S14. The IRCF is configured to filter out infrared rays so as to make the rays incident onto the imaging surface visible. Visible light has the wavelength ranging from 380 nm to 780 nm.

The imaging surface S15 is the surface where the image formed by the light of the photographed object after going through the optical system is located.

Table 7a illustrates the characteristics of the optical system in this disclosure, where the radius of curvature in this implementation is the radius of curvature of each of the lenses at the optical axis.

TABLE 7a

Seventh implementation
f = 7.5 mm, FNO = 2.44, FOV = 30.00°, TTL = 6.4 mm

| Surface number | Surface name | Surface type | Radius of curvature (mm) | Thickness (mm) | Material | Refractive index | Abbe number | Focal length (mm) |
|---|---|---|---|---|---|---|---|---|
| Object surface | Object surface | spheric | Infinity | Infinity | | | | |
| STO | Stop | aspheric | Infinity | −0.737 | | | | |
| S1 | First | aspheric | 1.855 | 1.210 | plastic | 1.54 | 56.14 | 3.40 |
| S2 | lens | aspheric | 994.000 | 0.030 | | | | |
| S3 | Second | aspheric | 9.375 | 0.230 | plastic | 1.66 | 20.35 | −8.46 |
| S4 | lens | aspheric | 3.489 | 0.262 | | | | |
| S5 | Third | aspheric | 6.627 | 0.230 | plastic | 1.64 | 23.54 | −27.66 |
| S6 | lens | aspheric | 4.766 | 1.248 | | | | |
| S7 | Fourth | aspheric | 7.385 | 0.329 | plastic | 1.54 | 56.14 | −6.06 |
| S8 | lens | aspheric | 2.249 | 1.017 | | | | |
| S9 | Fifth | aspheric | −5.708 | 0.601 | plastic | 1.64 | 23.54 | 19.50 |
| S10 | lens | aspheric | −4.088 | 0.030 | | | | |
| S11 | Sixth | aspheric | −8.233 | 0.372 | plastic | 1.54 | 56.14 | −19.64 |
| S12 | lens | aspheric | −36.045 | 0.380 | | | | |
| S13 | Infrared | spheric | Infinity | 0.110 | glass | | | |
| S14 | cut filter | spheric | Infinity | 0.350 | | | | |
| S15 | Imaging surface | spheric | Infinity | 0.000 | | | | |

Note:
a reference wavelength is 555 nm

In Table 7a, f represents the effective focal length of the optical system, FNO represents the f-number of the optical system, FOV represents the angle of view of the optical system diagonally, and TTL represents the distance on the optical axis from the object-side surface of the first lens to the imaging surface of the optical system.

Table 7b shows high-order coefficients A4, A6, A8, A10, A12, A14, A16, A18, and A20 which are applicable to each of the aspheric lens surfaces S1, S2, S3, S4, S5, S6, S7, S8, S9, S10, S11, and S12 of the seventh implementation.

TABLE 7b

| Surface number | K | A4 | A6 | A8 | A10 |
|---|---|---|---|---|---|
| S1 | −1.708E+00 | 3.540E−02 | −1.586E−02 | 4.963E−02 | −8.328E−02 |
| S2 | −8.300E+00 | −1.279E−01 | 4.675E−01 | −1.023E+00 | 1.487E+00 |
| S3 | −8.148E+00 | −1.595E−01 | 5.207E−01 | −1.111E+00 | 1.607E+00 |
| S4 | 4.367E+00 | −8.842E−02 | 3.128E−01 | −1.060E+00 | 2.736E+00 |
| S5 | −2.018E+00 | −8.868E−02 | 2.726E−01 | −9.817E−01 | 2.751E+00 |
| S6 | −7.313E+00 | −7.176E−02 | 2.457E−01 | −8.655E−01 | 2.419E+00 |
| S7 | −4.900E+00 | −2.274E−01 | −7.600E−03 | 6.331E−01 | −2.144E+00 |
| S8 | −8.399E+00 | −1.266E−01 | 9.693E−02 | 2.640E−02 | −1.307E−01 |
| S9 | −6.931E+00 | −2.218E−02 | 7.780E−03 | 3.852E−02 | −1.618E−01 |
| S10 | −1.017E+00 | −6.390E−03 | −2.256E−01 | 5.482E−01 | −8.317E−01 |
| S11 | 6.882E+00 | −7.949E−02 | −1.658E−01 | 2.059E−01 | −1.417E−01 |
| S12 | 8.617E+00 | −1.125E−01 | 9.102E−02 | −2.842E−01 | 4.408E−01 |

TABLE 7b-continued

| Surface number | A12 | A14 | A16 | A18 | A20 |
|---|---|---|---|---|---|
| S1 | 8.732E−02 | −5.733E−02 | 2.290E−02 | −5.090E−03 | 4.800E−04 |
| S2 | −1.406E+00 | 8.422E−01 | −3.079E−01 | 6.278E−02 | −5.480E−03 |
| S3 | −1.441E+00 | 7.594E−01 | −2.148E−01 | 2.503E−02 | 1.000E−04 |
| S4 | −4.690E+00 | 5.451E+00 | −4.107E+00 | 1.784E+00 | −3.358E−01 |
| S5 | −4.833E+00 | 5.502E+00 | −4.020E+00 | 1.713E+00 | −3.247E−01 |
| S6 | −4.152E+00 | 4.385E+00 | −2.809E+00 | 9.932E−01 | −1.487E−01 |
| S7 | 4.378E+00 | −5.536E+00 | 4.156E+00 | −1.691E+00 | 2.837E−01 |
| S8 | 2.458E−01 | −2.633E−01 | 1.519E−01 | −4.525E−02 | 5.630E−03 |
| S9 | 2.103E−01 | −1.413E−01 | 5.717E−02 | −1.377E−02 | 1.520E−03 |
| S10 | 7.549E−01 | −4.100E−01 | 1.328E−01 | −2.398E−02 | 1.870E−03 |
| S11 | 1.030E−01 | −5.713E−02 | 1.784E−02 | −2.720E−03 | 1.500E−04 |
| S12 | −3.479E−01 | 1.575E−01 | −4.181E−02 | 6.080E−03 | −3.800E−04 |

Figure 15:
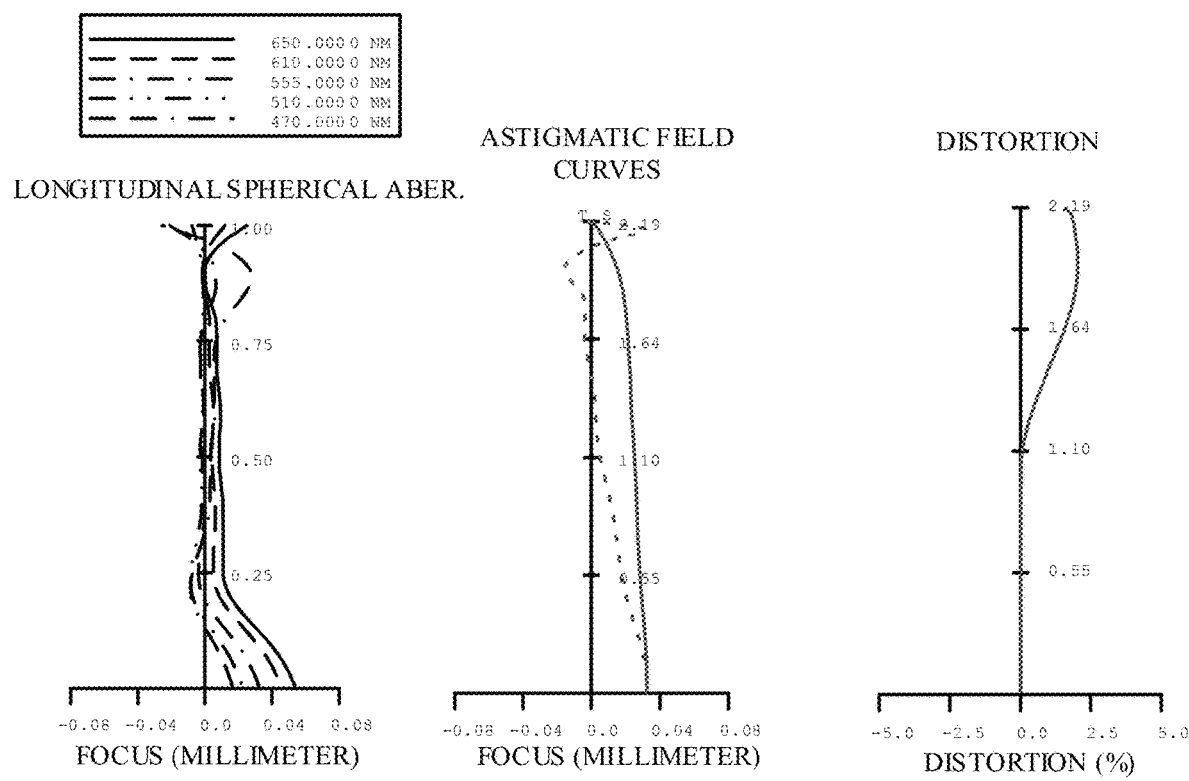
FIG. 15 illustrates a longitudinal spherical aberration curve, an astigmatic curve, and a distortion curve of the optical system according to the seventh implementation of this disclosure.

FIG. 15 shows the longitudinal spherical aberration curve, the astigmatic curve, and the distortion curve of the optical system according to the seventh implementation. The longitudinal spherical aberration curve represents that the converging point of rays with different wavelengths deviates after the rays go through the lenses of the optical system. The astigmatic curve represents meridional image plane bending and sagittal image plane bending. The distortion curve represents the distortion values corresponding to different angles of view. As can be seen in FIG. 15, the optical system in the seventh implementation has high imaging quality.

Eighth Implementation

Figure 16:
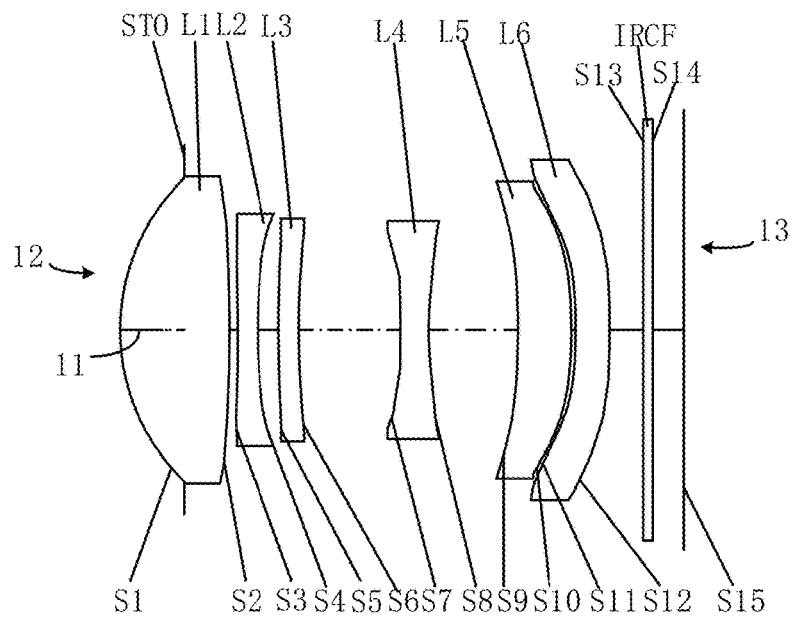
FIG. 16 is a schematic structural diagram of an optical system according to an eighth implementation of this disclosure.

In FIG. 16, the straight line 11 represents the optical axis. The side of the first lens L1 away from the second lens L2 is the object side 12 of the first lens L1. The side of the sixth lens L6 away from the fifth lens L5 is the image side 13 of the sixth lens L6. The optical system of this implementation includes, from the object side 12 to the image side 13, the stop STO, the first lens L1, the second lens L2, the third lens L3, the fourth lens L4, the fifth lens L5, the sixth lens L6, and the IRCF.

The first lens L1 with the positive refractive power is made of plastic. The object-side surface S1 is convex at the optical axis and at the circumference. The image-side surface S2 is convex at the optical axis and at the circumference. Both the object-side surface S1 and the image-side surface S2 of the first lens L1 are aspheric.

The second lens L2 with the negative refractive power is made of plastic. The object-side surface S3 is concave at the optical axis and convex at the circumference. The image-side surface S4 is concave at the optical axis and at the circumference. Both the object-side surface S3 and the image-side surface S4 of the second lens L2 are aspheric.

The third lens L3 with the negative refractive power is made of plastic. The object-side surface S5 is convex at the optical axis and concave at the circumference. The image-side surface S6 is concave at the optical axis and at the circumference. Both the object-side surface S5 and the image-side surface S6 of the third lens L3 are aspheric.

The fourth lens L4 with the negative refractive power is made of plastic. The object-side surface S7 is convex at the optical axis and concave at the circumference. The image-side surface S8 is concave at the optical axis and at the circumference. Both the object-side surface S7 and the image-side surface S8 of the fourth lens L4 are aspheric.

The fifth lens L5 with the positive refractive power is made of plastic. The object-side surface S9 is concave at the optical axis and at the circumference. The image-side surface S10 is convex at the optical axis and at the circumference. Both the object-side surface S9 and the image-side surface S10 of the fifth lens L5 are aspheric.

The sixth lens L6 with the negative refractive power is made of plastic. The object-side surface S11 is concave at the optical axis and at the circumference. The image-side surface S12 is convex at the optical axis and at the circumference. Both the object-side surface S11 and the image-side surface S12 of the sixth lens L6 are aspheric.

The stop STO can be located between the object side of the optical system and the sixth lens L6. In this implementation, the stop STO is disposed at the side of the first lens L1 away from the second lens L2 to control the amount of light received.

The IRCF is made of glass. The IRCF is disposed after the sixth lens L6. The IRCF includes the object-side surface S13 and the image-side surface S14. The IRCF is configured to filter out infrared rays so as to make the rays incident onto the imaging surface visible. Visible light has the wavelength ranging from 380 nm to 780 nm.

The imaging surface S15 is the surface where the image formed by the light of the photographed object after going through the optical system is located.

Table 8a illustrates the characteristics of the optical system in this disclosure, where the radius of curvature in this implementation is the radius of curvature of each of the lenses at the optical axis.

TABLE 8a

Eighth implementation
f = 7.5 mm, FNO = 2.44, FOV = 29.96°, TTL = 6.4 mm

| Surface number | Surface name | Surface type | Radius of curvature (mm) | Thickness (mm) | Material | Refractive index | Abbe number | Focal length (mm) |
|---|---|---|---|---|---|---|---|---|
| Object surface | Object surface | spheric | Infinity | Infinity | | | | |
| STO | Stop | aspheric | Infinity | −0.726 | | | | |
| S1 | First | aspheric | 1.865 | 1.239 | plastic | 1.54 | 56.14 | 3.20 |
| S2 | lens | aspheric | −21.523 | 0.093 | | | | |

TABLE 8a-continued

Eighth implementation
f = 7.5 mm, FNO = 2.44, FOV = 29.96°, TTL = 6.4 mm

| Surface number | Surface name | Surface type | Radius of curvature (mm) | Thickness (mm) | Material | Refractive index | Abbe number | Focal length (mm) |
|---|---|---|---|---|---|---|---|---|
| S3 | Second lens | aspheric | −1000.000 | 0.230 | plastic | 1.66 | 20.35 | −7.52 |
| S4 | | aspheric | 5.043 | 0.237 | | | | |
| S5 | Third lens | aspheric | 10.478 | 0.230 | plastic | 1.64 | 23.54 | −26.43 |
| S6 | | aspheric | 6.432 | 1.154 | | | | |
| S7 | Fourth lens | aspheric | 20.415 | 0.318 | plastic | 1.54 | 56.14 | −5.31 |
| S8 | | aspheric | 2.524 | 1.013 | | | | |
| S9 | Fifth lens | aspheric | −7.599 | 0.612 | plastic | 1.64 | 23.54 | 17.66 |
| S10 | | aspheric | −4.701 | 0.047 | | | | |
| S11 | Sixth lens | aspheric | −6.973 | 0.387 | plastic | 1.54 | 56.14 | −22.37 |
| S12 | | aspheric | −16.581 | 0.380 | | | | |
| S13 | Infrared cut filter | spheric | Infinity | 0.110 | glass | | | |
| S14 | | spheric | Infinity | 0.350 | | | | |
| S15 | Imaging surface | spheric | Infinity | 0.000 | | | | |

Note:
a reference wavelength is 555 nm

In Table 8a, f represents the effective focal length of the optical system, FNO represents the f-number of the optical system, FOV represents the angle of view of the optical system diagonally, and TTL represents the distance on the optical axis from the object-side surface of the first lens to the imaging surface of the optical system.

Table 8b shows high-order coefficients A4, A6, A8, A10, A12, A14, A16, A18, and A20 which are applicable to each of the aspheric lens surfaces S1, S2, S3, S4, S5, S6, S7, S8, S9, S10, S11, and S12 of the eighth implementation.

Figure 17:
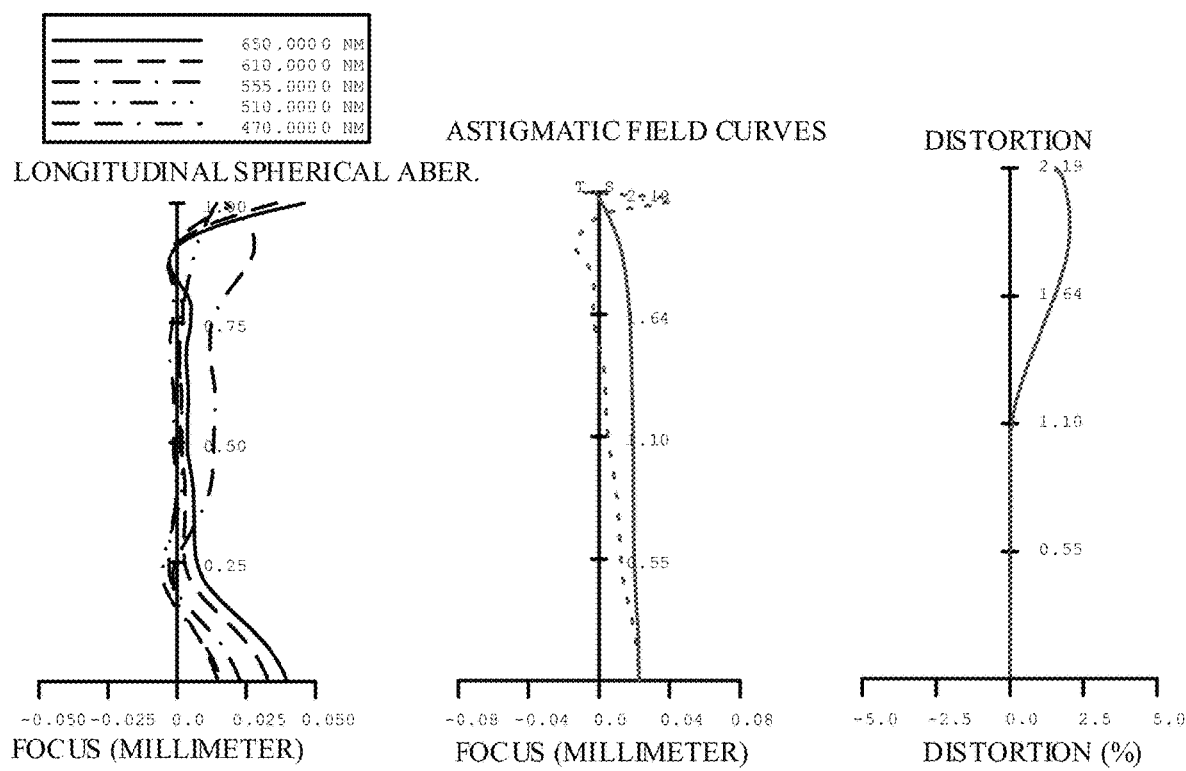
FIG. 17 illustrates a longitudinal spherical aberration curve, an astigmatic curve, and a distortion curve of the optical system according to the eighth implementation of this disclosure.

FIG. 17 shows the longitudinal spherical aberration curve, the astigmatic curve, and the distortion curve of the optical system according to the eighth implementation. The longitudinal spherical aberration curve represents that the converging point of rays with different wavelengths deviates after the rays go through the lenses of the optical system. The astigmatic curve represents meridional image plane bending and sagittal image plane bending. The distortion curve represents the distortion values corresponding to dif- TABLE 8b

| Surface number | K | A4 | A6 | A8 | A10 |
|---|---|---|---|---|---|
| S1 | −1.761E+00 | 3.395E−02 | −1.105E−02 | 3.390E−02 | −5.598E−02 |
| S2 | −8.300E+00 | −1.112E−01 | 2.928E−01 | −4.465E−01 | 5.126E−01 |
| S3 | −1.448E+01 | −1.962E−01 | 5.423E−01 | −8.739E−01 | 1.069E+00 |
| S4 | 5.517E+00 | −1.258E−01 | 4.581E−01 | −1.167E+00 | 2.550E+00 |
| S5 | −1.448E+01 | −5.960E−02 | 1.886E−01 | −7.106E−01 | 1.984E+00 |
| S6 | −1.313E+01 | −5.014E−02 | 1.372E−01 | −4.954E−01 | 1.344E+00 |
| S7 | −8.059E+00 | −2.910E−01 | 2.691E−02 | 8.283E−01 | −3.073E+00 |
| S8 | −8.407E+00 | −2.035E−01 | 1.837E−01 | 6.819E−02 | −5.157E−01 |
| S9 | 3.466E−01 | −3.125E−02 | 6.920E−03 | 6.165E−02 | −2.262E−01 |
| S10 | 4.897E−01 | −8.946E−02 | 1.695E−02 | 1.586E−01 | −4.225E−01 |
| S11 | 3.267E+00 | −1.689E−01 | 1.108E−01 | −1.871E−01 | 2.304E−01 |
| S12 | −3.336E−01 | −1.107E−01 | 9.094E−02 | −2.477E−01 | 3.717E−01 |

| Surface number | A12 | A14 | A16 | A18 | A20 |
|---|---|---|---|---|---|
| S1 | 5.837E−02 | −3.817E−02 | 1.519E−02 | −3.360E−03 | 3.100E−04 |
| S2 | −4.341E−01 | 2.471E−01 | −8.749E−02 | 1.731E−02 | −1.460E−03 |
| S3 | −9.498E−01 | 5.525E−01 | −1.894E−01 | 3.301E−02 | −2.010E−03 |
| S4 | −4.033E+00 | 4.348E+00 | −3.068E+00 | 1.282E+00 | −2.386E−01 |
| S5 | −3.337E+00 | 3.465E+00 | −2.275E+00 | 9.028E−01 | −1.698E−01 |
| S6 | −2.008E+00 | 1.520E+00 | −3.998E−01 | −1.301E−01 | 7.019E−02 |
| S7 | 6.655E+00 | −8.803E+00 | 6.840E+00 | −2.845E+00 | 4.782E−01 |
| S8 | 1.135E+00 | −1.412E+00 | 1.021E+00 | −4.057E−01 | 6.916E−02 |
| S9 | 3.098E−01 | −2.266E−01 | 9.770E−02 | −2.383E−02 | 2.540E−03 |
| S10 | 4.710E−01 | −2.842E−01 | 9.907E−02 | −1.902E−02 | 1.570E−03 |
| S11 | −1.496E−01 | 5.928E−02 | −1.568E−02 | 2.650E−03 | −2.100E−04 |
| S12 | −2.895E−01 | 1.298E−01 | −3.421E−02 | 4.950E−03 | −3.000E−04 | ferent angles of view. As can be seen in FIG. 17, the optical system in the eighth implementation has high imaging quality.

Table 9 shows the values of ftLtl4/ftGtl4 DL1/Imgh, f/f1, f1/f2, airL3/TTL, (R5*R6)/(R5+R6), FBL/TTL, DL/Imgh, TTL/f, and TTL/DL of the optical system from the first implementation to the eighth implementation.

TABLE 9

|  | ftLtl4/ftGtl4 | DL1/Imgh | f/f1 | f1/f2 | airL3/TTL |
|---|---|---|---|---|---|
| First implementation | 1.04 | 0.81 | 2.31 | −0.45 | 0.18 |
| Second implementation | 1.26 | 0.70 | 2.47 | −0.40 | 0.17 |
| Third implementation | 1.24 | 0.70 | 2.47 | −0.41 | 0.16 |
| Fourth implementation | 1.15 | 0.70 | 2.39 | −0.39 | 0.17 |
| Fifth implementation | 1.13 | 0.70 | 2.39 | −0.39 | 0.17 |
| Sixth implementation | 1.14 | 0.70 | 2.40 | −0.38 | 0.18 |
| Seventh implementation | 1.15 | 0.70 | 2.20 | −0.40 | 0.20 |
| Eighth implementation | 1.16 | 0.70 | 2.34 | −0.43 | 0.18 |

|  | (R5*R6)/(R5 + R6) | FBL/TTL | DL/Imgh | TTL/f | TTL/DL |
|---|---|---|---|---|---|
| First implementation | 1.15 | 0.131 | 0.81 | 0.90 | 1.79 |
| Second implementation | 1.64 | 0.131 | 0.70 | 0.85 | 2.09 |
| Third implementation | 1.72 | 0.131 | 0.70 | 0.85 | 2.08 |
| Fourth implementation | 2.75 | 0.131 | 0.70 | 0.85 | 2.08 |
| Fifth implementation | 2.74 | 0.137 | 0.70 | 0.85 | 2.08 |
| Sixth implementation | 2.78 | 0.131 | 0.70 | 0.85 | 2.08 |
| Seventh implementation | 2.77 | 0.131 | 0.70 | 0.85 | 2.08 |
| Eighth implementation | 3.99 | 0.131 | 0.70 | 0.85 | 2.08 |

As can be seen in Table 9, each of these implementations satisfies expressions 1<ftLtl4/ftGtl4<1.5, 0.5<DL1/Imgh<1, 2<f/f1<3, −0.5<f1/f2<−0.2, 0.05<airL3/TTL<0.3, 1 mm<(R5*R6)/(R5+R6)<4.5 mm, FBL/TTL>0.1, 0.5<DL/Imgh<1, 0.7<TTL/f<1, and 1.5<TTL/DL<2.2.

The implementations are described as above. It should be noted that any modifications, or improvements that can be made by those skilled in the art without departing from the spirits and principles of this disclosure shall all be encompassed within the protection of this disclosure.

What is claimed is:

1. An optical system comprising six lenses in total arranged in order from an object side to an image side, the six lenses comprise:
   a first lens with a positive refractive power, wherein the first lens has an object-side surface which is convex at an optical axis;
   a second lens with a negative refractive power, wherein the second lens has an image-side surface which is concave at the optical axis;
   a third lens with a negative refractive power, wherein the third lens has an object-side surface which is convex at the optical axis and an image-side surface which is concave at the optical axis;
   a fourth lens with a negative refractive power, wherein the fourth lens has an image-side surface which is concave at the optical axis;
   a fifth lens with a refractive power; and
   a sixth lens with a refractive power;
   wherein the optical system satisfies the following expression:

1≤ftLtl4/ftGtl4<1.5, wherein ftLtl4 represents a longest distance from the object-side surface of the fourth lens to the image-side surface of the fourth lens in a direction parallel to the optical axis, and ftGtl4 represents a shortest distance from the object-side surface of the fourth lens to the image-side surface of the fourth lens in the direction parallel to the optical axis.

2. The optical system as claimed in claim 1, wherein the optical system satisfies the following expression:

0.5<DL1/Imgh<1, wherein DL1 represents an effective aperture of the first lens, and Imgh represents half of a diagonal length of an effective pixel area of the optical system on an imaging surface.

3. The optical system as claimed in claim 1, wherein the optical system satisfies the following expression:

2<f/f1<3, wherein f represents an effective focal length of the optical system, and f1 represents a focal length of the first lens.

4. The optical system as claimed in claim 1, wherein the optical system satisfies the following expression:

−0.5<f1/f2<−0.2, wherein f1 represents a focal length of the first lens, and f2 represents a focal length of the second lens.

5. The optical system as claimed in claim 1, wherein the optical system satisfies the following expression:

0.05<airL3/TTL<0.3, wherein airL3 represents a distance on the optical axis from the image-side surface of the third lens to the object-side surface of the fourth lens, and TTL represents a distance on the optical axis from the object-side surface of the first lens to an imaging surface of the optical system.

6. The optical system as claimed in claim 1, wherein the optical system satisfies the following expression:

1 mm<(R5*R6)/(R5+R6)<4.5 mm, wherein R5 represents a radius of curvature of the object-side surface of the third lens on the optical axis, and R6 represents a radius of curvature of the image-side surface of the third lens on the optical axis.

7. The optical system as claimed in claim 1, wherein the optical system satisfies the following expression:

FBL/TTL>0.1, wherein FBL represents a distance on the optical axis from an intersection between the image-side surface of the sixth lens and the optical axis to an imaging surface of the optical system, and TTL represents a distance on the optical axis from the object-side surface of the first lens to the imaging surface of the optical system.

8. The optical system as claimed in claim 1, further comprising:
a stop located at an object side of the first lens or between two adjacent lenses among the plurality of lenses, and the optical system satisfying the following expression:

$$0.5<DL/\text{Imgh}<1,$$

wherein DL represents an aperture of the stop, and Imgh represents half of a diagonal length of an effective pixel area of the optical system on an imaging surface.

9. The optical system as claimed in claim 1, further comprising:
a stop located at the object side of the first lens or between two adjacent lenses among the plurality of lenses, and the optical system satisfying the following expression:

$$1.5<TTL/DL<2.2,$$

wherein TTL represents a distance on the optical axis from the object-side surface of the first lens to an imaging surface of the optical system, and DL represents an aperture of the stop.

10. The optical system as claimed in claim 1, wherein the optical system satisfies the following expression:

$$0.7<TTL/f<1,$$

wherein TTL represents a distance on the optical axis from the object-side surface of the first lens to an imaging surface of the optical system, and f represents an effective focal length of the optical system.

11. A lens module, comprising:
an optical system, comprising six lenses in total arranged in order from an object side to an image side, the six lenses comprise:
a first lens with a positive refractive power, wherein the first lens has an object-side surface which is convex at an optical axis;
a second lens with a negative refractive power, wherein the second lens has an image-side surface which is concave at the optical axis;
a third lens with a negative refractive power, wherein the third lens has an object-side surface which is convex at the optical axis and an image-side surface which is concave at the optical axis;
a fourth lens with a negative refractive power, wherein the fourth lens has an image-side surface which is concave at the optical axis;
a fifth lens with a refractive power; and
a sixth lens with a refractive power;
wherein the optical system satisfies the following expression:

$$1 \leq \text{ftLtl4}/\text{ftGtl4}<1.5,$$

wherein ftLtl4 represents a longest distance from the object-side surface of the fourth lens to the image-side surface of the fourth lens in a direction parallel to the optical axis, and ftGtl4 represents a shortest distance from the object-side surface of the fourth lens to the image-side surface of the fourth lens in the direction parallel to the optical axis; and
a photosensitive element located at the image side of the optical system.

12. The lens module as claimed in claim 11, wherein the optical system satisfies the following expression:

$$0.5<DL1/\text{Imgh}<1,$$

wherein DL1 represents an effective aperture of the first lens, and Imgh represents half of a diagonal length of an effective pixel area of the optical system on an imaging surface.

13. The lens module as claimed in claim 11, wherein the optical system satisfies the following expression:

$$2<f/f1<3,$$

wherein f represents an effective focal length of the optical system, and f1 represents a focal length of the first lens.

14. The lens module as claimed in claim 11, wherein the optical system satisfies the following expression:

$$-0.5<f1/f2<-0.2,$$

wherein f1 represents a focal length of the first lens, and f2 represents a focal length of the second lens.

15. The lens module as claimed in claim 11, wherein the optical system satisfies the following expression:

$$0.05<\text{airL3}/TTL<0.3,$$

wherein airL3 represents a distance on the optical axis from the image-side surface of the third lens to the object-side surface of the fourth lens, and TTL represents a distance on the optical axis from the object-side surface of the first lens to an imaging surface of the optical system.

16. The lens module as claimed in claim 11, wherein the optical system satisfies the following expression:

$$1 \text{ mm}<(R5*R6)/(R5+R6)<4.5 \text{ mm},$$

wherein R5 represents a radius of curvature of the object-side surface of the third lens on the optical axis, and R6 represents a radius of curvature of the image-side surface of the third lens on the optical axis.

17. The lens module as claimed in claim 11, wherein the optical system satisfies the following expression:

$$FBL/TTL>0.1,$$

wherein FBL represents a distance on the optical axis from an intersection between the image-side surface of the sixth lens and the optical axis to an imaging surface of the optical system, and TTL represents a distance on the optical axis from the object-side surface of the first lens to the imaging surface of the optical system.

18. The lens module as claimed in claim 11, wherein the optical system further comprises:
a stop located at an object side of the first lens or between two adjacent lenses among the plurality of lenses, and the optical system satisfying the following expression:

$$0.5<DL/\text{Imgh}<1,$$

wherein DL represents an aperture of the stop, and Imgh represents half of a diagonal length of an effective pixel area of the optical system on an imaging surface.

19. The lens module as claimed in claim 11, wherein the optical system further comprises:
a stop located at the object side of the first lens or between two adjacent lenses among the plurality of lenses, and the optical system satisfying the following expression:

$$1.5<TTL/DL<2.2,$$

wherein TTL represents a distance on the optical axis from the object-side surface of the first lens to an imaging surface of the optical system, and DL represents an aperture of the stop.

20. A terminal device, comprising:
the lens module as claimed in claim 11.

* * * * *